(12) United States Patent
Staples et al.

(10) Patent No.: US 12,144,325 B2
(45) Date of Patent: Nov. 19, 2024

(54) SELECTIVELY-ACCESSIBLE FEEDER

(71) Applicants: The United States of America, as Represented by the Secretary of Agriculture, Washington, DC (US); Animal Control Technologies (Australia) Pty Ltd, Victoria (AU)

(72) Inventors: Linton Drew Staples, Canterbury (AU); Michael John Lavelle, Washington, DC (US); Joseph Martin Halseth, Washington, DC (US); Nathan Paul Snow, Washington, DC (US); Brendan Lake, Kennedy Town (HK)

(73) Assignees: The United States of America as Represented by the Secretary of Agriculture, Washington, DC (US); Animal Control Technologies (Australia) Pty Ltd, Somerton (AU)

( * ) Notice: Subject to any disclaimer, the term of this patent is extended or adjusted under 35 U.S.C. 154(b) by 221 days.

(21) Appl. No.: 17/270,855

(22) PCT Filed: Aug. 26, 2019

(86) PCT No.: PCT/AU2019/050903
§ 371 (c)(1),
(2) Date: Feb. 23, 2021

(87) PCT Pub. No.: WO2020/037381
PCT Pub. Date: Feb. 27, 2020

(65) Prior Publication Data
US 2021/0204509 A1    Jul. 8, 2021

Related U.S. Application Data

(60) Provisional application No. 62/722,669, filed on Aug. 24, 2018.

(51) Int. Cl.
| | | |
|---|---|---|
| *A01K 5/02* | (2006.01) | |
| *A01K 5/01* | (2006.01) | |
| *A01M 25/00* | (2006.01) | |

(52) U.S. Cl.
CPC .............. *A01K 5/025* (2013.01); *A01K 5/01* (2013.01); *A01M 25/002* (2013.01)

(58) Field of Classification Search
CPC ................................ A01K 5/025; A01K 5/01
See application file for complete search history.

(56) References Cited

U.S. PATENT DOCUMENTS

| | | | | |
|---|---|---|---|---|
| 23,386 A * | 3/1859 | Packer | ...................... | A01K 5/01 119/58 |
| 725,162 A * | 4/1903 | Smith | ...................... | A01K 5/01 119/63 |

(Continued)

FOREIGN PATENT DOCUMENTS

| | | |
|---|---|---|
| CN | 205409045 U | 8/2016 |
| CN | 207040508 U | 2/2018 |
| NZ | 543902 A | 1/2009 |

OTHER PUBLICATIONS

International Search Report and Written Opinion mailed Nov. 6, 2019 in connection with International Application No. PCT/AU2019/050903.

(Continued)

*Primary Examiner* — Jessica B Wong
(74) *Attorney, Agent, or Firm* — Wolf, Greenfield & Sacks, P.C.

(57) ABSTRACT

An apparatus for baiting and/or feeding target animals comprises: a trough to contain bait and/or feed; and a closure which can be urged by at least one said target animal so as to move from a closed position, in which it precludes access to the bait and/or feed by the target animal(s), to an open position, which is such that said access is enabled, the (Continued)

apparatus being configured such that the closure offers a resistance to being moved which is sufficient that it cannot be urged by another animal to move from the closed position to the open position.

16 Claims, 27 Drawing Sheets

(56) References Cited

U.S. PATENT DOCUMENTS

| | | | | |
|---|---|---|---|---|
| 1,438,028 A * | 12/1922 | Faust | ............... | A01K 5/01 |
| | | | | 119/61.3 |
| 1,469,961 A * | 10/1923 | Rood | ............... | A01K 5/025 |
| | | | | 119/52.4 |
| 1,719,245 A * | 7/1929 | Smidley | ............ | A01K 5/025 |
| | | | | 119/53.5 |
| 1,746,558 A * | 2/1930 | Rowe | ............... | A01K 5/025 |
| | | | | 119/902 |
| 1,772,843 A * | 8/1930 | Rickey | ............. | A01K 5/025 |
| | | | | 119/52.4 |
| 1,910,596 A * | 5/1933 | Einsel | ............. | A01K 5/025 |
| | | | | 119/53 |
| 2,736,127 A | 2/1956 | McCann | | |
| 2,961,695 A * | 11/1960 | Fradd | ............. | E05D 15/565 |
| | | | | 220/812 |
| 2,972,979 A * | 2/1961 | Struck | ............. | A01K 5/01 |
| | | | | 30/131 |
| 3,176,656 A * | 4/1965 | Bates | ............... | A01K 5/025 |
| | | | | 119/62 |
| 3,631,840 A * | 1/1972 | McCormack | ........ | A01K 5/0291 |
| | | | | 119/51.12 |
| 3,942,478 A | 3/1976 | Lane | | |
| 3,982,501 A * | 9/1976 | Marzocco | ............ | A01K 5/0291 |
| | | | | 119/51.14 |
| 5,546,894 A | 8/1996 | St-Pierre | | |
| 5,909,717 A * | 6/1999 | Randall | ............... | A01K 5/0114 |
| | | | | 119/58 |
| 2016/0113247 A1 | 4/2016 | McCord et al. | | |
| 2016/0227736 A1 | 8/2016 | Monk | | |
| 2017/0142929 A1 | 5/2017 | Poché | | |
| 2018/0098532 A1* | 4/2018 | Poché | ................ | A01K 5/02 |

OTHER PUBLICATIONS

International Preliminary Report on Patentability mailed Dec. 15, 2020 in connection with International Application No. PCT/AU2019/050903.

Supplementary Partial European Search Report dated Aug. 17, 2022 in connection with European Application No. 19853174.

Lavelle et al., Development and Evaluation of a Bait Station for Selectively Dispensing Bait to Invasive Wild Pigs. USDA Wildlife Services Wildlife Society Bulletin 2018;42(1):102-10.

Snow et al., Strength Testing of Racoons and Invasive Wild Pigs for a Species-Specific Bait Station. Wildlife Society Bulletin. Jun. 2017;41(2):264-70.

* cited by examiner

SELECTIVELY-ACCESSIBLE FEEDER

CROSS-REFERENCE TO RELATED APPLICATIONS

The present application is a National Stage filing under 35 U.S.C. § 371 of International Patent Application Serial No. PCT/AU2019/050903, entitled "SELECTIVELY-ACCESSIBLE FEEDER", filed Aug. 26, 2019, which is incorporated by reference herein in its entirety. International Patent Application Serial No. PCT/AU2019/050903 claims the benefit of U.S. Provisional Patent Application Ser. No. 62/722,669, entitled "SELECTIVELY-ACCESSIBLE FEEDER", filed Aug. 24, 2018, which is incorporated by reference herein in its entirety.

The disclosure relates to a feeder providing selective access to food material within the feeder. The entire content of U.S. provisional patent application No. 62/722,669 is incorporated herein by reference.

Invasive wild pigs (*Sus scrofa*) are spreading across many regions around the globe and causing extensive damage to natural and anthropogenic resources. Effective tools to control the spread and manage the problem are needed. Due to the variety and number of potential non-target species across the landscape, responsible use of a toxicant would need to be limited to delivery from a feeder that limits consumption exclusively to pigs. Examples of non-target species which should be excluded are white-tailed deer (*Odocoileus virginianus*), raccoons (*Procyon lotor*), as well as birds such as common passerines (i.e., songbirds), galliformes (i.e., turkeys, pheasants, etc).

For wild pigs in particular, in order to feed/bait the maximum number of individuals present, dominance issues surrounding group feeding behaviors of pigs that routinely limit simultaneous feeding would need to be addressed.

In this context, there is a need for improved feeders for selectively feeding and/or baiting one or more specific groups of animals.

According to a first aspect of the present invention, there is provided an apparatus for baiting and/or feeding target animals, comprising:

a trough to contain bait and/or feed; and a closure which can be urged by at least one said target animal so as to move from a closed position, in which it precludes access to the bait and/or feed by the target animal(s), to an open position, which is such that said access is enabled, the apparatus being configured such that the closure offers a resistance to being moved which is sufficient that it cannot be urged by another animal to move from the closed position to the open position.

The closure may be pivotably connected to said trough to be pivotably movable between the closed and open positions.

The closure may comprise a lid.

The closure may be bistable so as to offer said resistance in a first condition thereof and not to offer said resistance in a second condition thereof. For example, the closure and trough may comprise mechanically interengageable elements, one of which elements may be resiliently deformable to engage/when engaging with the other of said elements, to offer said resistance in the first condition and not to offer said resistance in a second condition when the elements are not interengaged. In another example, the closure may be snap fitted or otherwise engaged with the trough via friction fit. In yet another example, the closure may be spring-loaded or otherwise biased towards the first condition. In yet another example, as described in more detail below, the closure and trough may comprise magnetically interengageable elements.

The closure may assume said first condition in said closed position and may assume said second condition by being moved towards said open position.

The apparatus may be configured such that the trough and closure interengage magnetically, whereby the closure offers said resistance, when the closure is in the closed position.

One of the trough and closure may comprise at least one magnetic portion and the other of the trough and closure may comprise at least one magnetically engageable portion, the or each magnetic portion being arranged to engage a said magnetically engageable portion when the closure is in the closed position.

Each or at least one said magnetically engageable portion may be magnetic.

The, each or at least one said magnetically engageable portion may be magnetically susceptible.

The apparatus may include at least one connector arranged to receive an anchor, such as a peg or stake, to retain the trough against ground on which it is positioned when the closure is so urged.

The connector may comprise an eyelet.

The trough may comprise a housing and at least one receptacle removably receivable in the housing to hold said bait/feed in the housing.

The receptacle may comprise a tray.

The trough may include a retainer engageable with the or each receptacle to secure it in the housing.

The or each retainer may comprise a retaining member configured to abut the receptacle(s) to retain it/them in position in the trough.

The or each retaining member may comprise at least one portion arranged to abut an upwardly facing surface of the or each receptacle so as to retain the receptacle(s) vertically.

The or each retaining member may comprise at least one portion arranged to abut an upright surface of the or each receptacle so as to retain the receptacle(s) horizontally.

The or each retaining member may be configured with one or more voids, the or each void being arranged to align with an opening of a respective said receptacle abutted by that retaining member, so as to permit access to the bait/feed through the opening.

The apparatus may comprise plural said receptacles to be arranged one-beside-another in the housing.

The apparatus may be configured with at least one void arranged such that a scent of said bait/feed can carry therethrough to be detectable by a said target animal when the closure is in the closed position.

The or each void may extend through the trough.

The or each void may be defined by an aperture.

The or each void may open through an upper edge of the trough arranged to be abutted by the closure when in the closed position and spaced from the closure when in the open position.

The closure may be configured with at least one void, the or each void being arranged to align, when the closure is in the closed position, with a respective said void which opens though said upper edge, such that there is defined at least one aperture, comprising respective aligned voids, through which said scent can carry.

Said edge may be configured with formations, such as corrugations or serrations, each defining a respective said void which opens through the upper edge.

The closure may include at least one snout-engageable portion arranged so as to be engageable by a snout of at least one said target animal such that the closure is so urged.

The or each snout-engageable portion may be arranged so as to be so engageable from beneath.

The or each snout-engageable portion may be arranged so as to be adjacent said void(s) when the closure is in the closed position.

The or each snout-engageable portion may be defined by a part of the closure arranged to abut said edge when the closure is in the closed position.

The closure may be pivotably connected at a proximal end thereof to the trough and the or each snout engageable portion may be at a distal end of the closure.

The or each snout engageable portion may be arranged to project outwardly when the closure is in the closed position so as to be so engageable.

The apparatus may include a lock operable to hold the closure open, whereby access to the bait and/or feed by target animals is facilitated or permitted.

The lock may comprise at least one prop arranged to extend between the trough and the closure.

The at least one said prop may comprise a rod or post.

At least one said prop may comprise a spacer.

The lock may comprise at least one lock member mounted to one of the trough and the closure so as to be rotatable between an operative position, in which it abuts the other of the trough and the closure so as to hold the closure open, and an inoperative position, which is such that movement of the closure to the closed position is permitted.

The closure may be pivotably connected at a proximal end thereof to one side of trough, such that, when the closure is in the open position, the bait/feed is accessible by the target animal(s) from at least one other side of the trough, and the or each lock member may be mounted at or adjacent said proximal end so as not to obstruct said access.

The lock may be adjustable, or operable, to hold the closure open to varying extents whereby access to the bait by target animal(s) is facilitated or permitted.

The closure may be arranged so as to rest against the target animal(s) accessing the bait/feed whereby it is held open.

The closure and trough may comprise coupling components arranged to couple when the closure is in the closed position, whereby the closure offers said resistance, and to decouple upon movement of the closure towards the open position.

The coupling components may be bistable such that said closure is bistable.

The coupling components may be magnetically interengageable.

At least one said coupling component may be placeable into an inoperable condition such that the closure does not offer said resistance.

The apparatus may be modular whereby it can be arranged contiguously with at least one other said apparatus such that there is defined a composite baiting and/or feeding apparatus comprising the contiguously arranged apparatuses.

In a further aspect of the present invention, there is provided a composite baiting and/or feeding apparatus comprising an apparatus as described and at least one said other apparatus with which it is contiguously arranged.

In a further aspect of the present invention, there is provided a system for forming a composite baiting and/or feeding apparatus, the system comprising apparatuses each as described.

The apparatuses may comprise ones configured to be arranged side-by-side in said composite baiting and/or feeding apparatus.

The apparatuses may comprise ones configured to be arranged back-to-back in said composite baiting and/or feeding apparatus.

The apparatuses may be configured to be connected one-to-another in the composite baiting and/or feeding apparatus.

In a further aspect of the present invention, there is provided a method of baiting one or more target animals, wherein:

at least one said target animal urges at least one said closure of an apparatus as described such that said resistance is overcome and that closure thus moves from the closed position thereof to the open position thereof and said access to bait contained in the trough of the apparatus for baiting and/or feeding which comprises that closure is thus permitted; and at least one said target animal ingests a quantity of bait the access to which is permitted.

On at least one occasion previous to said at least one target animal urging at least one said closure such that it moves to the open position thereof whereby said access to bait is permitted, at least one said target animal may access feed contained in at least one said trough so as to ingest that feed, whereby it is conditioned to ingest the bait.

On at least one said occasion, the lock of that apparatus may operate to hold the closure of that apparatus open, whereby at least one said target animal accesses feed contained in the trough of that apparatus so as to ingest that feed.

On successive said occasions, the lock of that apparatus may operate to hold the closure of that apparatus open to decreasing ones of said extents, whereby at least one said target animal accesses feed contained in the trough of that apparatus so as to ingest that feed.

On at least one said occasion, at least one said coupling component of that apparatus may assume a said inoperable condition such that the closure of that apparatus does not offer said resistance and at least one said target animal urges that closure such that it moves to said open position whereby at least one said target animal accesses feed contained in the trough of that apparatus so as to ingest that feed.

On at least one said occasion, at least one said target animal may urge at least one said closure such that that closure moves from the closed position thereof to the open position thereof and thus accesses feed contained in the trough of that apparatus so as to ingest that feed.

On at least one said occasion, at least one said target animal may urge at least one said closure such that said resistance is overcome and that closure thus moves from the closed position thereof to the open position thereof and thus accesses feed contained in the trough of that apparatus so as to ingest that feed.

Said bait may be poisonous or toxic and said at least one said target animal ingests a lethal quantity thereof, so as to be euthanized or killed.

According to another aspect of the present invention, there is provided a feeder comprising:

a trough for receiving food material; and a cover hingingly connected to the trough at a first end and magnetically secured to the trough at a second end, wherein magnetic force of said securement is selected to enable a specific group of animals to lift the cover and access the food material within the trough, while preventing access by smaller animals.

The magnetic securement may comprise a magnetic plate on a rim of the trough and a corresponding magnetic or ferromagnetic plate on an underside of the cover.

The pull strength of the magnetic securement may be selected to correspond to the expected strength of an animal of the species *Sus scrofa*.

The pull strength of the magnetic securement may be between about 5 kg and about 25 kg.

The pull strength of the magnetic securement may be between about 10 kg and about 20 kg.

The pull strength of the magnetic securement may be about 13 kg.

The feeder may be configured to be removably mounted to a like feeder in back-to-back configuration and/or lengthwise.

According to another aspect of the present invention, there is provided a feeder comprising:

a trough for receiving food material; and a cover hingingly connected to the trough and configured to be lifted by a target animal in order to access the food material within the trough, wherein the feeder is configured to be removably mounted to a like feeder.

The feeder may be configured to be mounted to a like feeder in back-to-back configuration.

The feeder may be mountable in back-to-back arrangement with a like feeder by end plates detachably mounted to adjacent end faces of the feeders.

The feeder may be mountable in back-to-back arrangement with a like feeder via coupling means removably insertable into an aperture in each feeder.

The feeder may be configured to be mounted to a like feeder in side-by-side configuration.

The trough may be elongate for side-by-side feeding of a plurality of animals.

The feeder may be configured such that in use, the cover is propped up by an animal while it is feeding from the trough.

The feeder may comprise a stopper to limit opening distance of the cover.

The feeder may further comprise ventilation holes for diffusing odors out of the trough.

The feeder may comprise a series of channels provided along an upper edge of the trough and a series of corresponding channels along an underside of the cover, said channels defining a series of ventilation apertures along the feeder when the cover is closed.

The feeder may further comprise feed trays detachably retained within the trough.

The feeder may further comprise water diversion channels positioned at perimeter regions of the trough.

The cover may be hinged to the trough via an integral hinge comprising a rod provided within cavities integrally formed in the trough and cover.

The feeder may further comprise a training device provided to retain the cover in an open position during free-feeding training.

The training device may comprises one or more of: a post, a spacer, and cam retainers.

The training device may comprise cam retainers positioned at or adjacent the first end of the trough.

The feeder may further comprise feed trays detachably retained within the trough.

The feed trays may be detachably retained within the trough via a tray retaining plate hingingly secured to the trough.

The tray retaining plate may be removably secured to the trough.

In a further aspect of the present invention, there is provided a method for selectively baiting a specific group of animals using the feeder or apparatus as described, comprising:

placing non-toxic food material in the trough and retaining the cover in an open position for free-feeding training; and after a period of free-feeding training, placing toxic food material in the trough and closing the cover.

The method may further comprise placing non-toxic food material around the feeder during free-feeding training.

The free-feeding training step may comprise retaining the cover in said open position for a period of time, and subsequently retaining the cover in a smaller open position compared with said open position for a period of time.

The free-feeding training step may further comprise removing the magnetic securement from the feeder and closing the cover.

The invention will now be described, by way of non-limiting example only, with reference to the accompanying drawings, in which.

Figure 1:
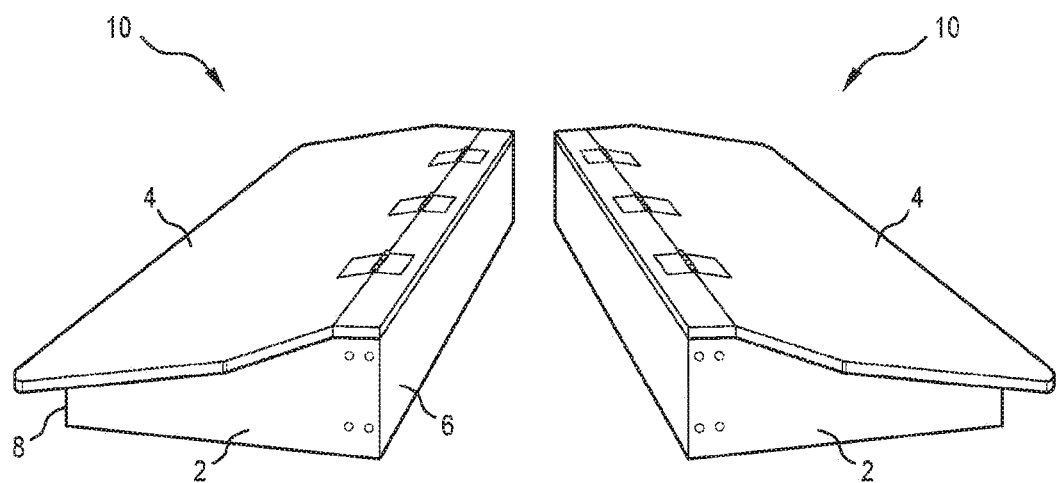
FIG. 1 illustrates two identical feeders according to one embodiment.

FIGS. 1 to 6 illustrate a feeder/apparatus 10 (hereinafter "feeder") according to one embodiment, comprising a trough 2 for receiving food material/feed/bait 3, and a cover/closure 4 (hereinafter "cover") which can be urged by at least one target animal so as to move from a closed position, in which it precludes access to the bait and/or feed by the target animal(s), to an open position, which is such that said access is enabled. The feeder 10 is configured such that the cover 4 offers a resistance to being moved which is sufficient that it cannot be urged by another animal to move from the closed position to the open position.

The cover 4 may be connected to the trough 2, eg hingingly connected to the trough, at a first end 6, and magnetically secured to the trough at a second end 8, wherein magnetic force of the securement is selected to enable a specific group of animals to open the cover 4 to access the food material within the trough, while preventing access by smaller/weaker animals.

The magnetic securement may be provided by at least one magnetic portion on one of the trough and cover, and at least one magnetically engageable portion on the other of the trough and cover, the or each magnetic portion being arranged to engage a magnetically engageable portion when the cover is in the closed position. For example, the magnetic securement may be provided by a magnetic plate 12 on rim 14 of the trough 2 and a corresponding magnetic or ferromagnetic plate 16 on an underside 18 of the cover 4, or vice versa. The pull force of the magnetic arrangement is selected to correspond to the expected strength of the target animal.

While the magnetic arrangement 12, 16 is illustrated positioned centrally along the front wall of the feeder at the second end 8 of the trough, it should be appreciated that other configurations are possible, eg a plurality of magnetic arrangements may be provided, spaced along the front wall of the feeder. This alternative embodiment may improve securement of the cover 4 at the front corners of the feeder 10. The feeder 10 may be configured so that it is possible to reposition the magnets, to add or remove magnets, and/or to change the magnetic strength of the magnets, to enable the feeder 10 to be configured to suit different target species or adapted based on the characteristics of the target animals in a specific location, or optimised based on observations.

Alternatively, an electromagnetic arrangement (not shown) could be utilized. If so, the electromagnetic arrangement may be controlled via sensors, optionally in conjunction with sound, image and/or movement recognition software to distinguish the target animal from other species, and thereby activate or deactivate the electromagnets accordingly.

The cover 4 is therefore bistable (due to the magnetic interengagement) so as to offer the resistance to being moved in a first condition and not to offer that resistance in a second condition. The cover 4 assumes the first condition in the closed position and assume the second condition by being moved towards the open position. It has been found that the magnetic interengagement reliably and consistently provides that resistance to being moved, and also ensures that the cover consistently reverts to the first condition when closed. However, other means for providing a bistable cover may alternatively or additionally be applied. For example, the closure and trough may comprise mechanically interengageable elements, one of which elements may be resiliently deformable when engaging with the other of said elements, to offer resistance in the first condition and not to offer said resistance in a second condition when the elements are not interengaged. In another example, the closure may be snap fitted or otherwise engaged with the trough via friction fit. In yet another example, the closure may be spring-loaded or otherwise biased towards the first condition.

Figure 4:
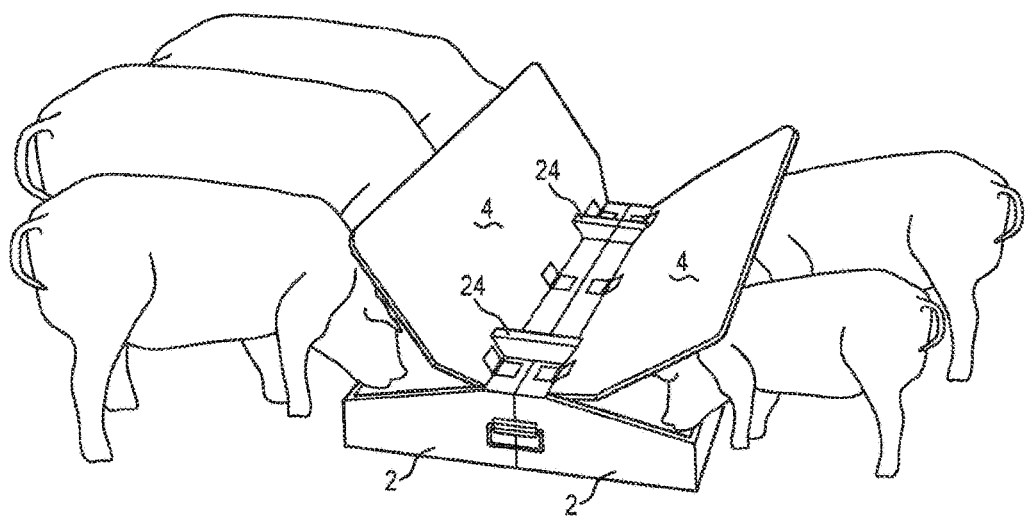
FIG. 4 illustrates the feeders of FIGS. 2 and 3 in use, feeding a plurality of pigs.
Figure 5:
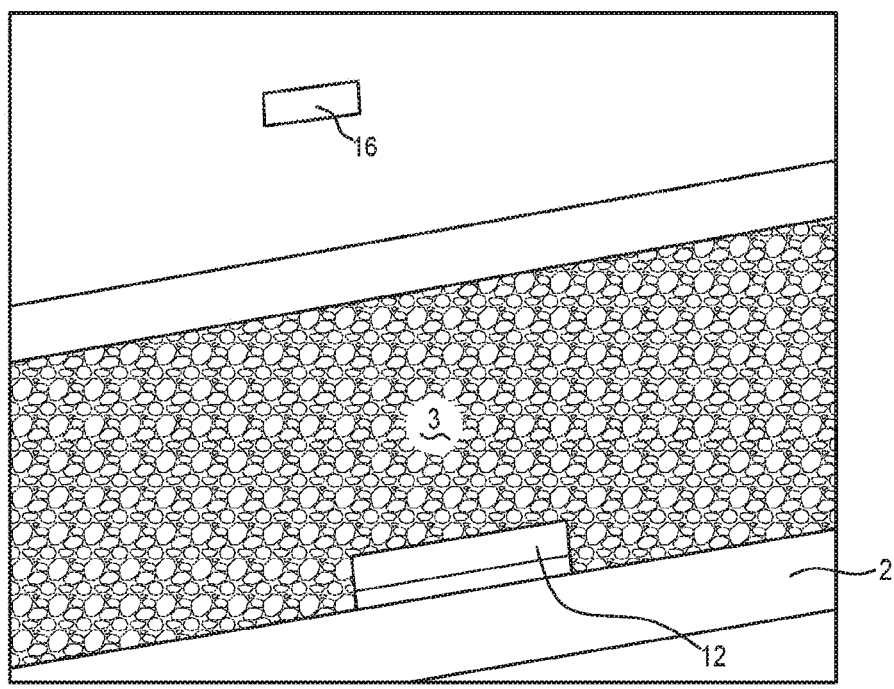
FIG. 5 illustrates details of a magnetic securement of the feeder.

The trough 2 of the feeder 10 is configured to receive food material or bait (optionally in combination with a toxicant) in the form of paste, granules, pellets, etc., to be accessed by the target animal once the cover 4 has been lifted. As illustrated in FIG. 4, the cover 4 is propped up by the animal while it is feeding from the trough 2. Accordingly, the cover is preferably constructed of a relatively lightweight material to ensure acceptance and comfort of the animal while feeding.

Figure 17:
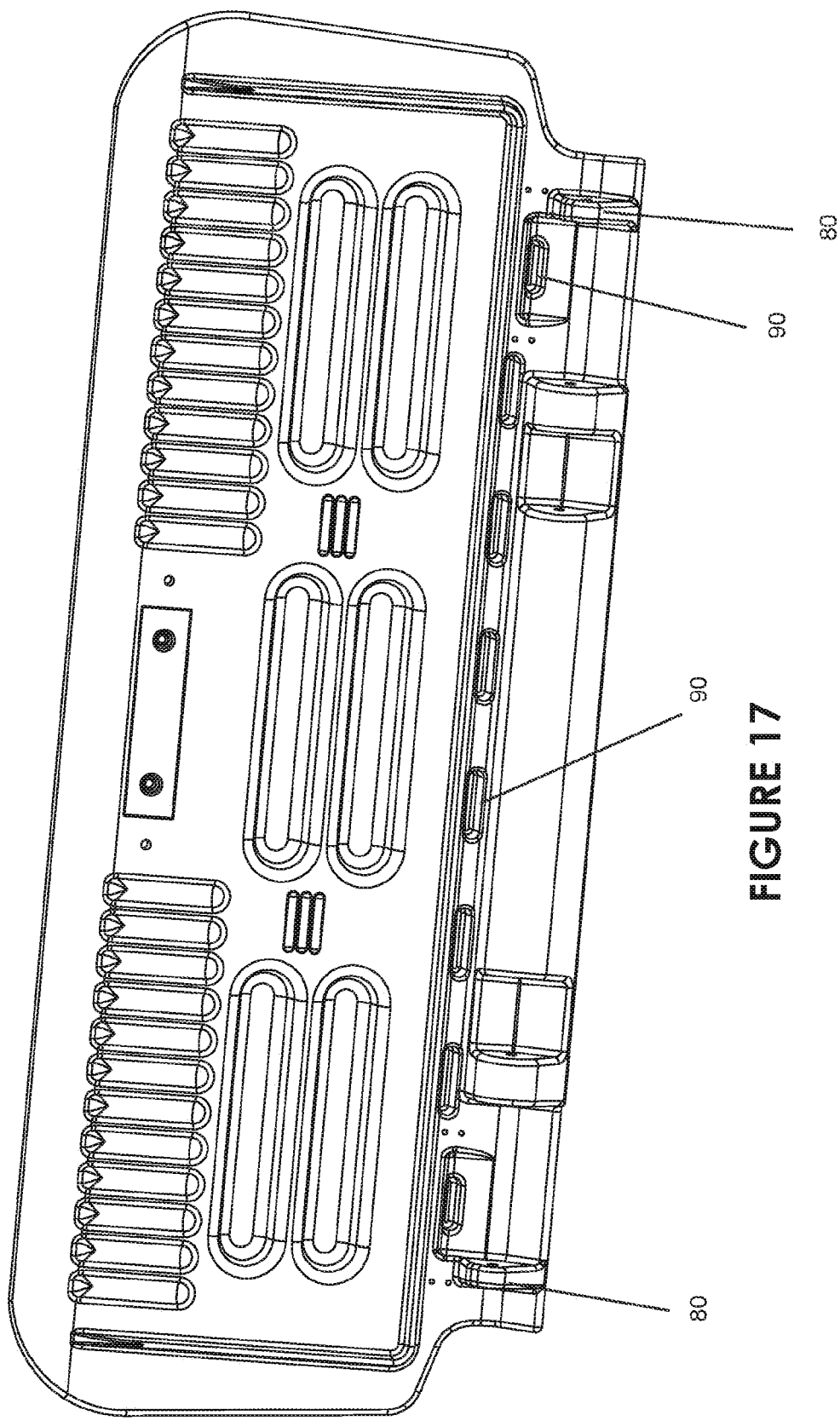
FIG. 17 illustrates a cover of the feeder according to an embodiment
Figure 18:
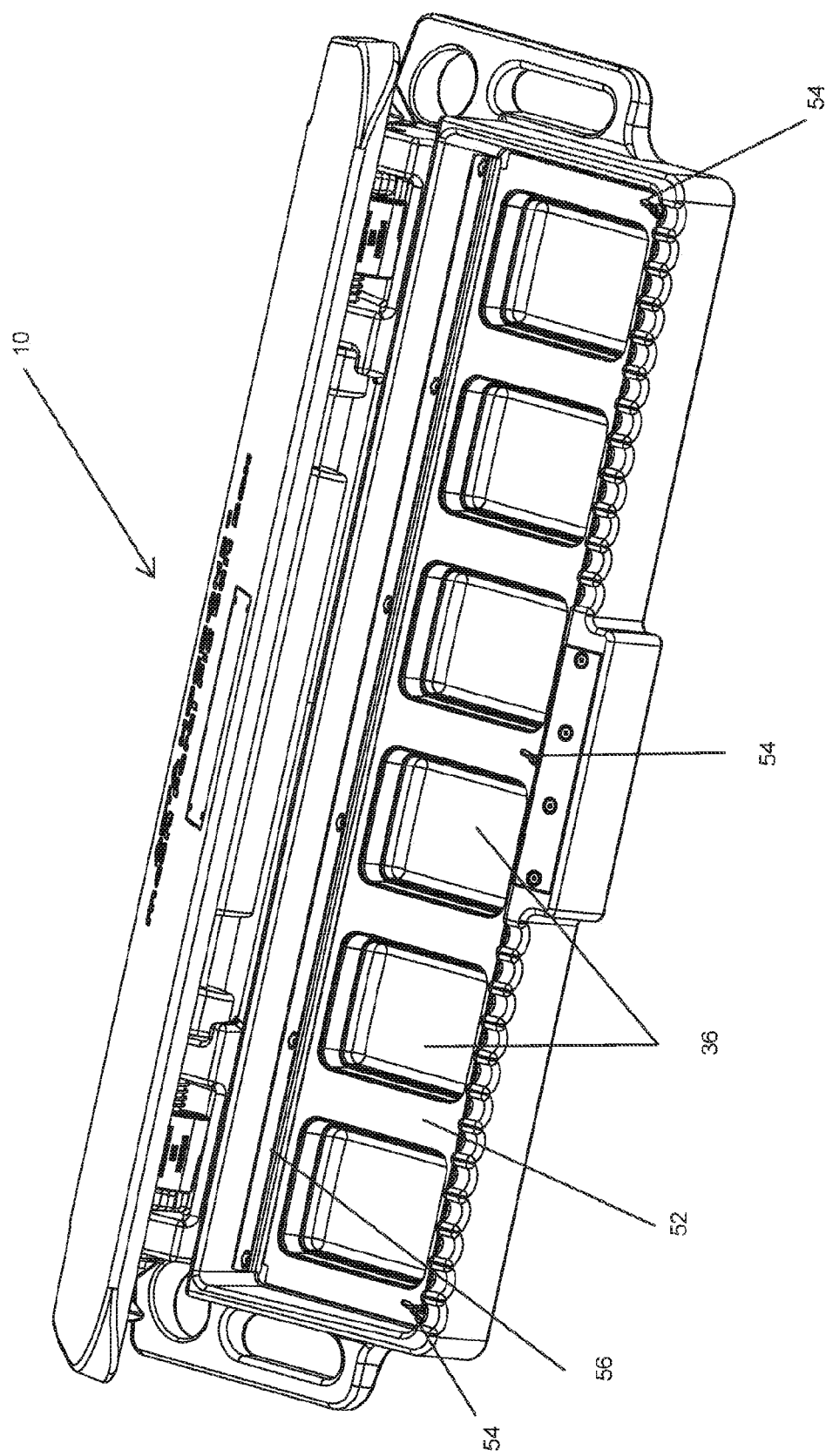
FIG. 18 illustrates a feeder according to another embodiment.

FIG. 17 illustrates various means for reinforcing the lightweight construction of the cover 4. Kiss-off ribbing 90 may be provided to prevent flexing and warping of the cover 4. Lugs 80 may be provided for attaching the cover 4 to the trough at several points along the length of the cover.

Figure 2:
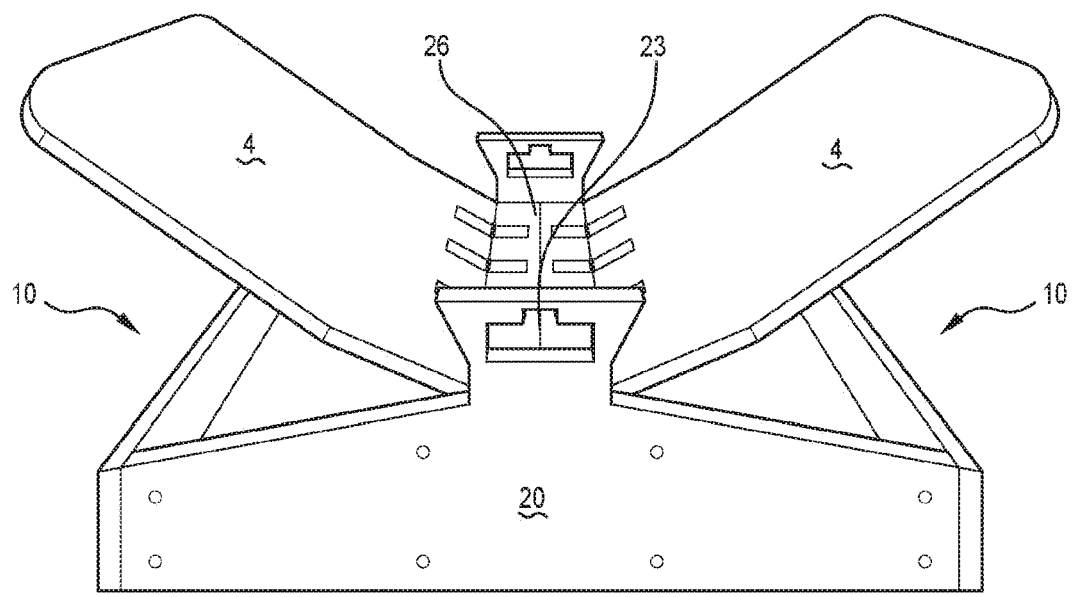
FIG. 2 illustrates the feeders of FIG. 1 connected together.
Figure 3:
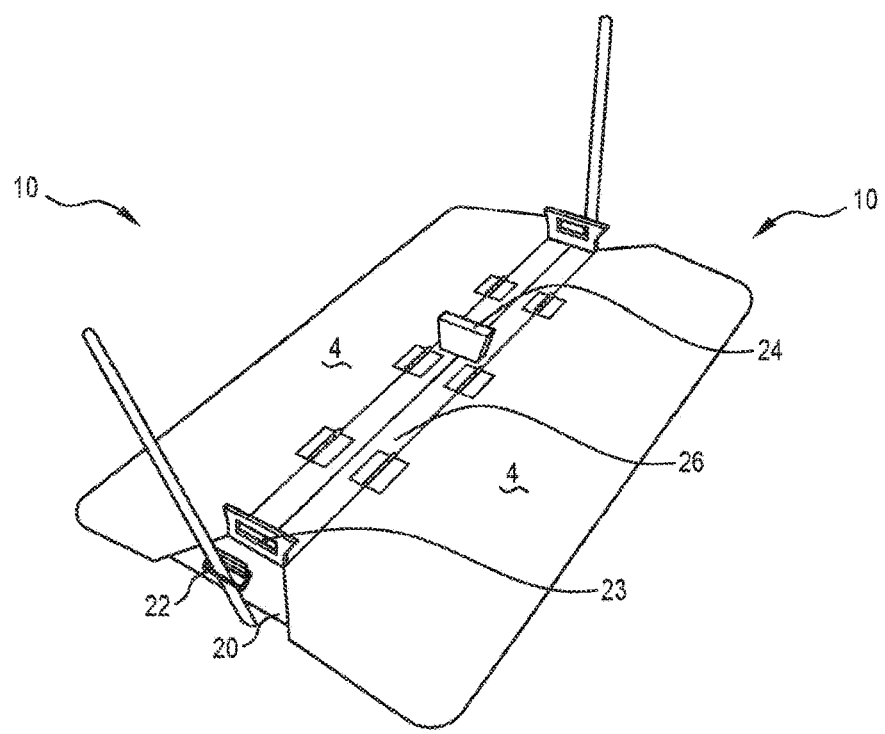
FIG. 3 illustrates the feeders of FIG. 2 assembled on site.

The feeder 10 may be removably mounted to a like feeder 10, for example in back-to-back configuration as illustrated in FIGS. 2 to 4. It is envisaged that the feeders 10 may additionally or alternatively be connected side-by-side/lengthwise (not shown). This modular configuration of the feeder 10 provides the flexibility of installing a single feeder if the estimated population of pigs in the target area is low, and conversely, to increase the number of feeders in a single assembly for a larger expected population. The feeders 10 may be held in back-to-back arrangement by end plates 20 detachably mounted to the end faces of the feeders. Each end-plate 20 may also comprise a mounting aperture 22 to provide an attachment point for securing the feeder 10 to the ground using appropriate stakes and fasteners. The end-plate may comprise a handle 23 to facilitate handing and transportation of the feeders. End-plates 20 and/or central stoppers 24 detachably mounted on the central spine 26 between the feeders 10 prevent the covers 4 from opening too far and potentially remaining open following feeding. The cover 4 is instead biased closed (due to its weight and the magnetic force) when not propped open by an animal.

Figure 13:
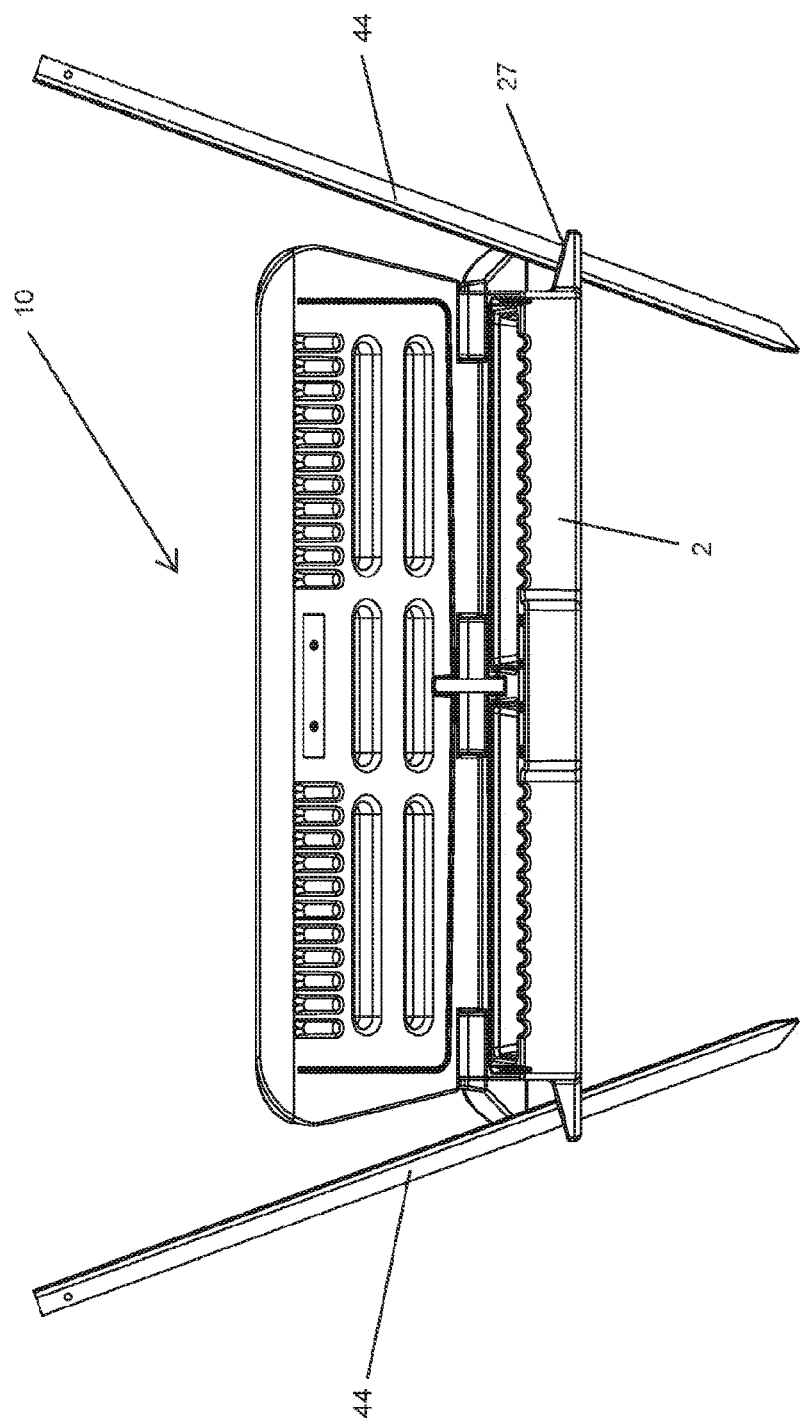
FIG. 13 illustrates the fasteners for securing the feeder to the ground, according to one embodiment.

FIGS. 7 to 13 illustrate another embodiment of the feeder 10, comprising a trough 2 with at least one mounting lug/connector 27 (hereinafter "mounting lug") for securing the feeder 10 to the ground using appropriate fasteners, such as a stake 44 or peg (see FIG. 13). Two such feeders 10 may be arranged or held in back-to-back arrangement, eg via coupling means such as U-shaped rails 42 (see FIGS. 11 and 12), each rail being removably inserted into an aperture in each feeder to hold them together. In some embodiments, the U-shaped rails 42 also conveniently function as handles on each end of the double feeder arrangement. The cover 4 may be hinged to the trough 2 via an integral hinge comprising rod 50 provided within cavities integrally formed in the trough 4 and cover 2, the rod 50 extending the length of the hinge.

Figure 6:
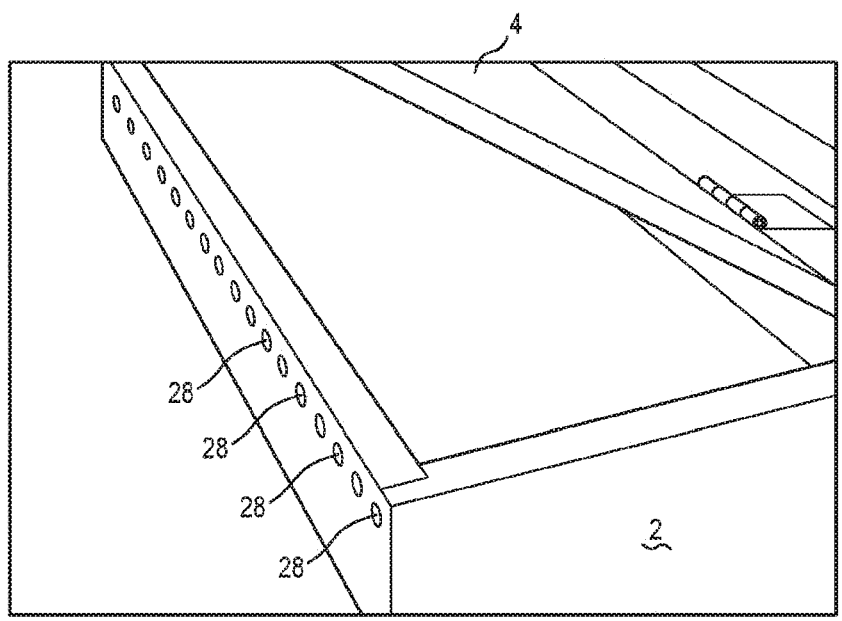
FIG. 6 illustrates details of ventilation holes of the feeder.
Figure 7:
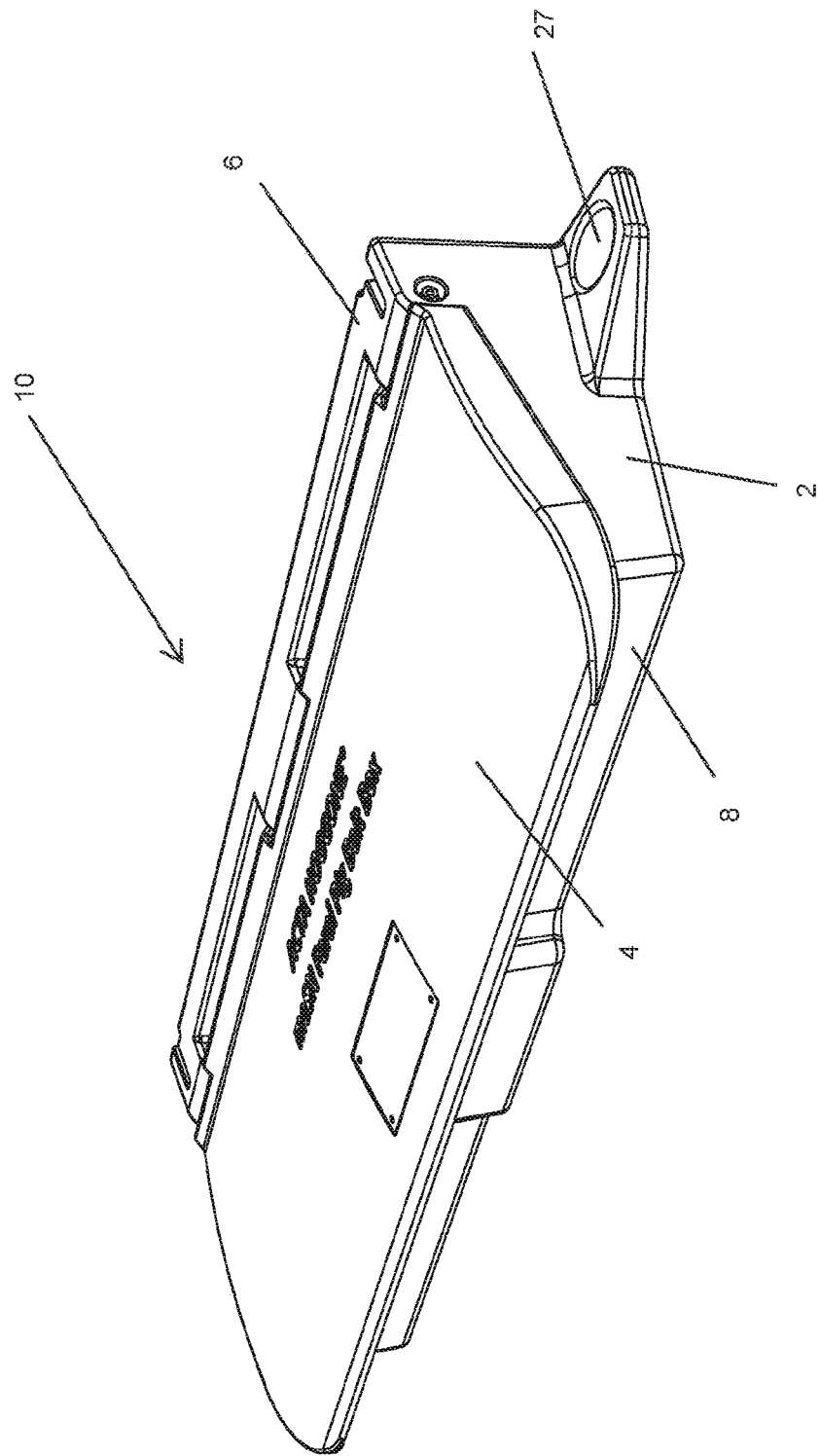
FIGS. 7 and 8 illustrate top and bottom views of a feeder according to another embodiment.
Figure 8:
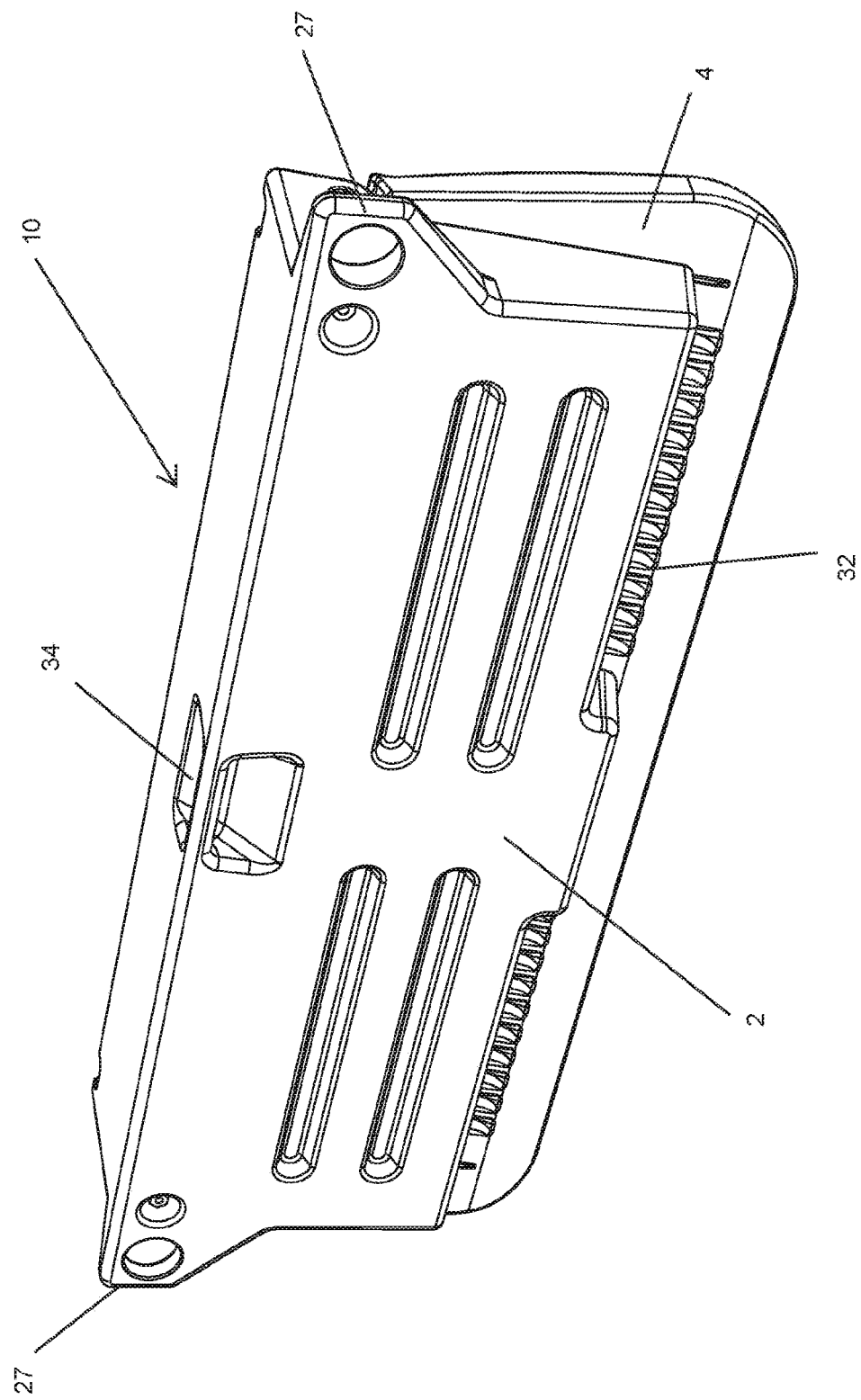

The feeder 10 preferably comprises at least one void/ventilation hole 28 (hereinafter "ventilation hole") to allow odors from the bait to diffuse out from within the trough 2. In some embodiments, eg as illustrated in FIG. 6, the ventilation holes may be provided on a wall of the trough 2. In other embodiments, eg as illustrated in FIGS. 7 to 10, the ventilation holes 28 may comprise a series of channels 30 along the upper edge of the first end 6 of the trough 2 and a series of corresponding channels 32 along the underside of the cover 4 that together form a series of ventilation apertures along the front edge of the feeder when the cover 4 is closed. Preferably, the size of each ventilation hole 28 does not exceed about 0.5 inches (1.3 cm) in diameter, to prevent access by smaller, non-target animals.

The feeder 10 is preferably designed with a low profile and natural muted colors, so as to be relatively inconspicuous when installed, to facilitate acceptance by the target animals and to be less visible to humans. Alternatively, the feeder 10 could be designed with bright colors for easier/quicker identification in the field. At least the cover 4 could be of a dark color to increase heat absorption and thereby minimize freezing of the feed/bait in cold environments. Alternatively, at least the cover 4 could be of a light color to reflect heat and thereby minimize melting/spoiling of the feed/bait in hot environments.

In one example, the feeder 10 is about 9 inches (23 cm) high, about 36 inches (92 cm) deep and about 54 inches (138 cm) long; these dimensions result in a stable design that is less likely to be overturned by animals. It has been found that a feeder according to these dimensions, when used to target wild pigs, enables multiple pigs to access the feed simultaneously, while also allowing for convenient and cost-effective transportation in standard pallet stacks.

Further, the feeder 10 is preferably stackable with like feeders; the portable, stackable configuration facilitates storage and transportation of multiple feeders. The modular design of preferred embodiments of the feeders 10 as discussed above enables the feeders to be detached from each other for ease of transportation and storage. Recessed carrying handles 34 on the first end of the trough 2 further facilitates transportation and handling. It is envisaged that the feeder would be deployable by a single individual.

The feeder 10 is preferably constructed of a non-porous plastics material or other material which is suitably lightweight, durable, easy to clean and sanitise, and substantially weather-proof. In one embodiment, the trough is rotationally molded of a plastics material.

Figure 14:
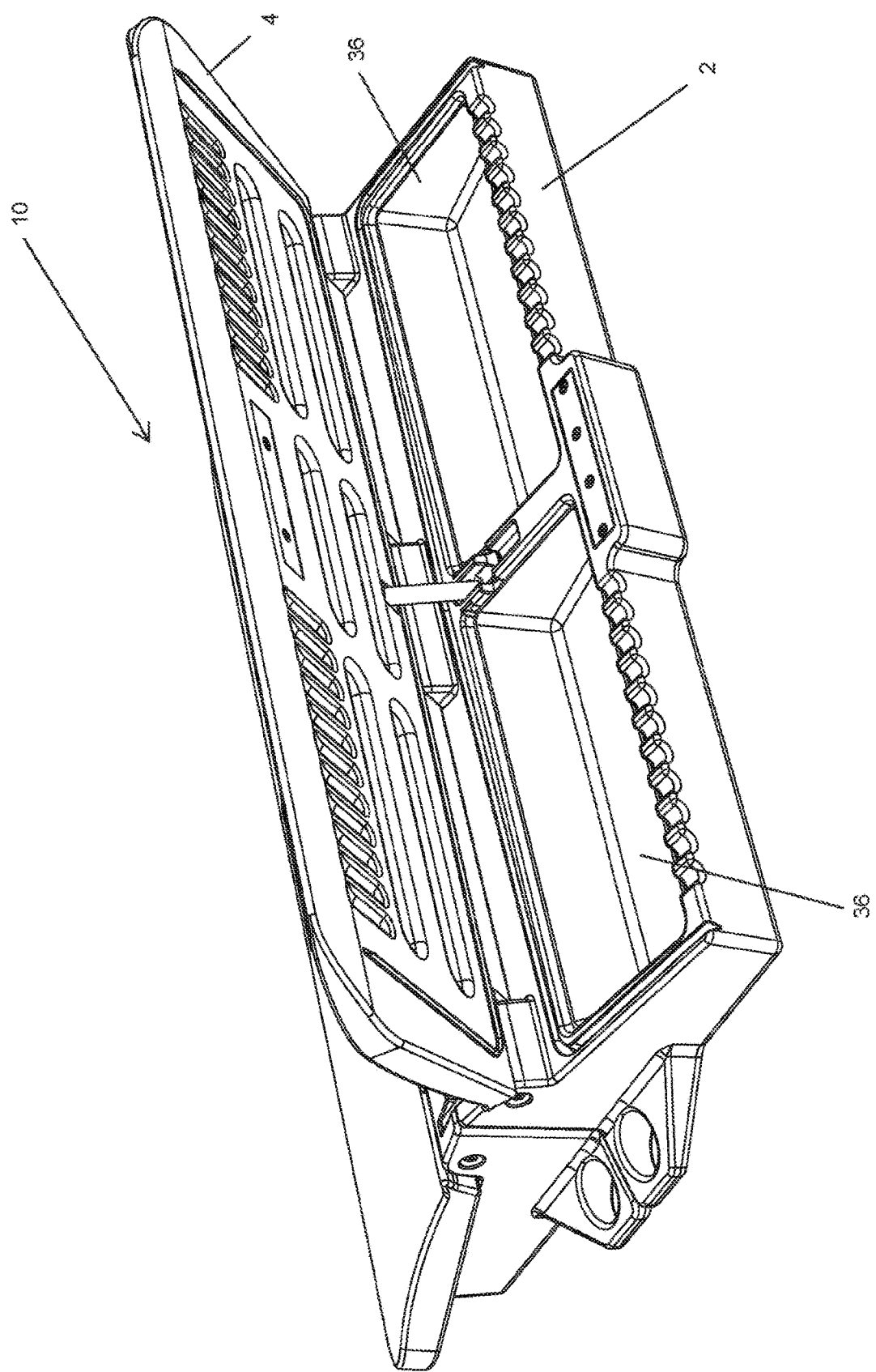
FIG. 14 illustrates the feeder having removable feed trays, according to one embodiment.

As illustrated in FIG. 14, the food material/feed/bait may be provided in feed trays/receptacles 36 (hereinafter "feed trays") which may be individually removable from the trough 2, to facilitate cleaning and refilling of the feeders. Suitable retaining means, eg a retaining flange in the trough (not shown), may be provided to prevent the animals from removing the trays from the feeders.

In another embodiment more clearly illustrated in FIGS. 18 to 24, feed trays 36 are detachably retained within the trough via a retainer/tray retaining plate 52 (hereinafter "tray retaining plate"). The tray retaining plate 52 comprises a plurality of voids/apertures 54 (hereinafter "apertures"), each corresponding to the opening of each feed tray 36. The retainer/tray retaining plate 52 may comprise a retaining member configured to abut the feed trays to retain them in position in the trough 2. For example, a portion of the tray retaining plate 52 defining the perimeter of each aperture 53 is configured to overlie at least a portion of the an upwardly facing surface, eg rim 37, of each feed tray 36 when the tray retaining plate 52 is secured to the trough, thereby sandwiching the rim 37 between the tray retaining plate 52 and the trough. Each feed tray 36 is thereby secured within the trough 2 and retained vertically. In some embodiments, the portion of the tray retaining plate 52 defining the perimeter of each aperture 53 may be configured (eg via a downwardly-extending flange) to overlie an upper portion of one or more side walls/upright surfaces of each feed tray 36, for improved retention of the feed trays 36 within the trough 2, ie to retain the trays horizontally.

The tray retaining plate 52 may itself be detachably secured to the trough 2 via a plurality of fasteners such as wingnuts 54 along one edge of the plate 52, and slidably or hingingly retained within retaining track 56 along another edge of the plate 52.

Figure 19:
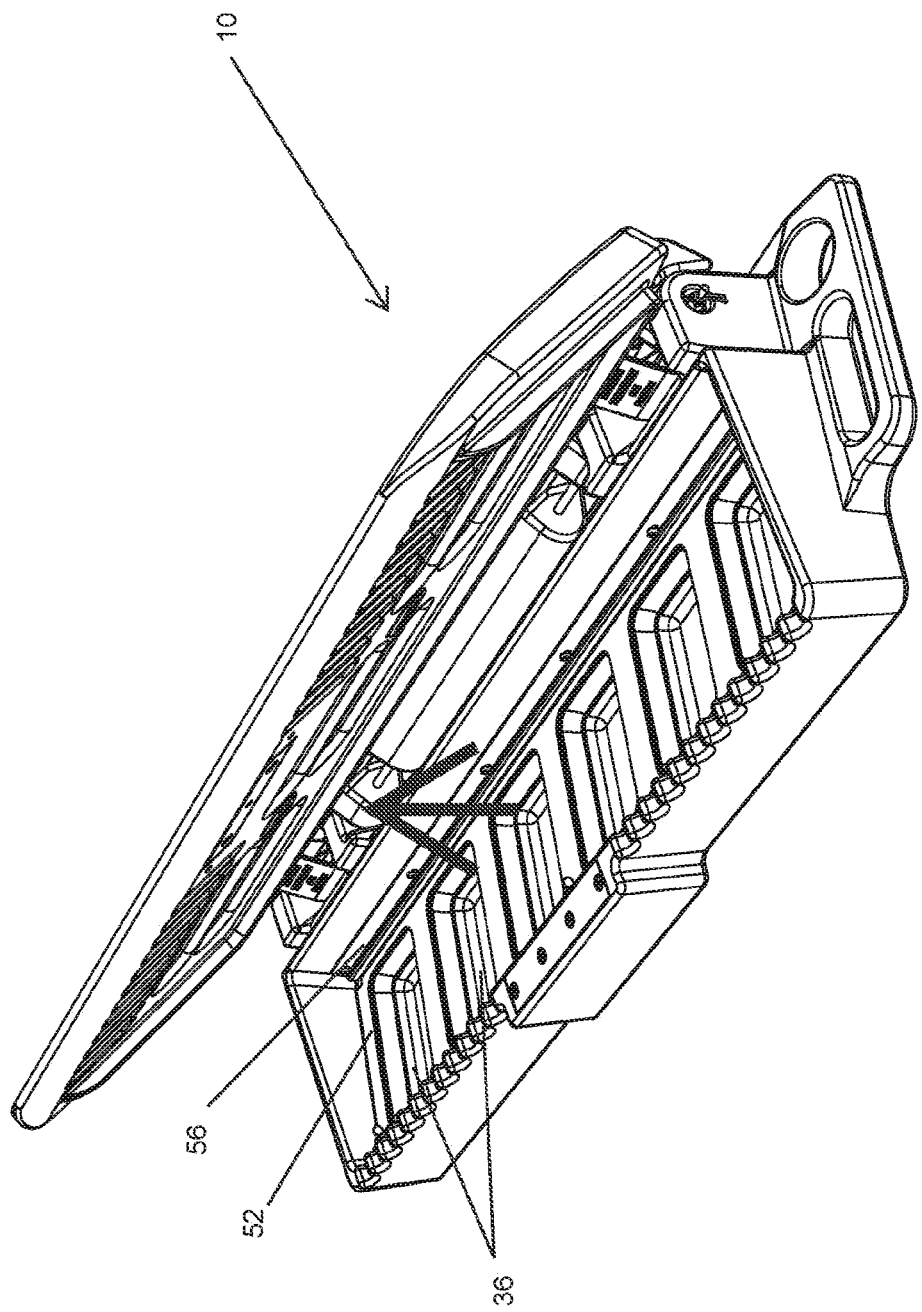
FIGS. 19 and 20 illustrate steps for releasing the feed trays of the feeder of FIG. 18 according to one embodiment.
Figure 20:
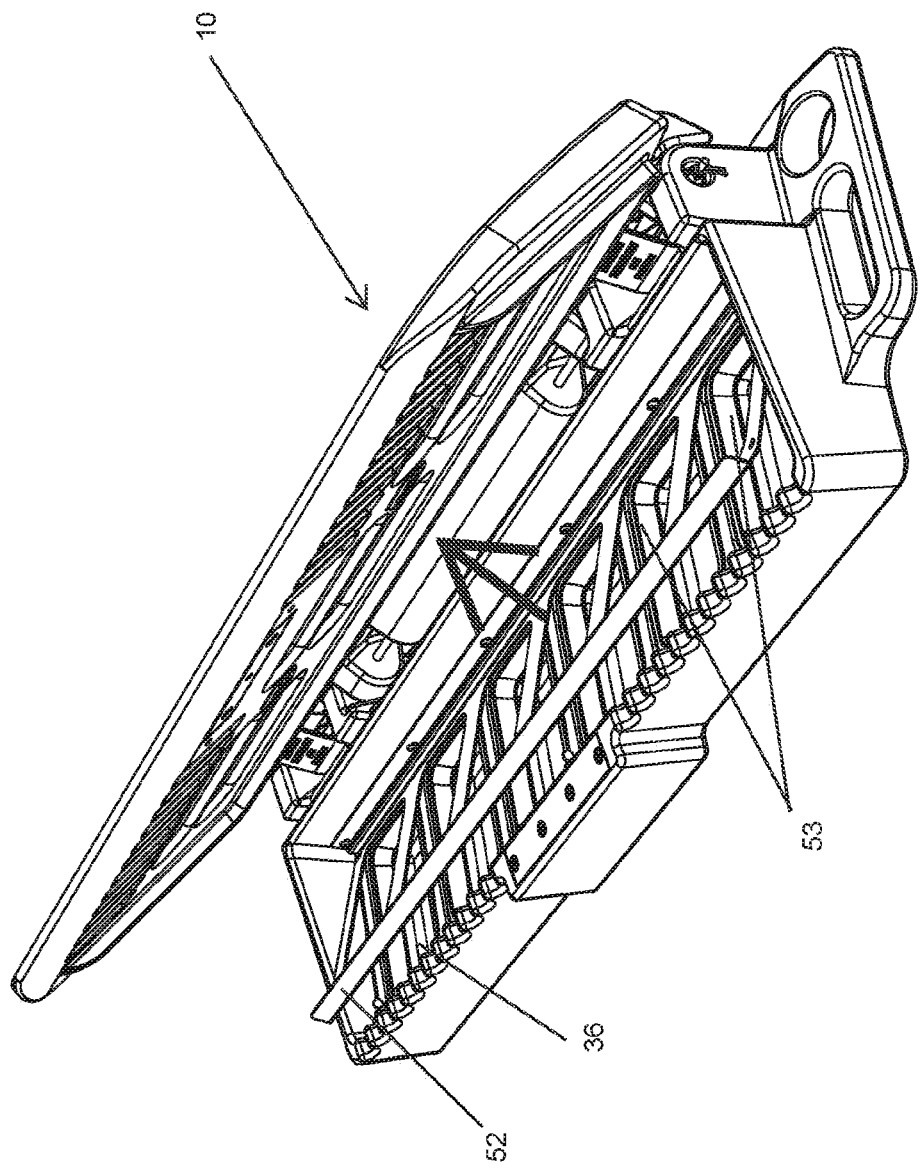

As illustrated in FIGS. 19 and 20, to remove the feed trays 36, the fasteners 54 of the tray retaining plate 52 are firstly removed. The tray retaining plate 52 may then be lifted along one edge to access and remove the underlying feed trays 36.

Figure 21:
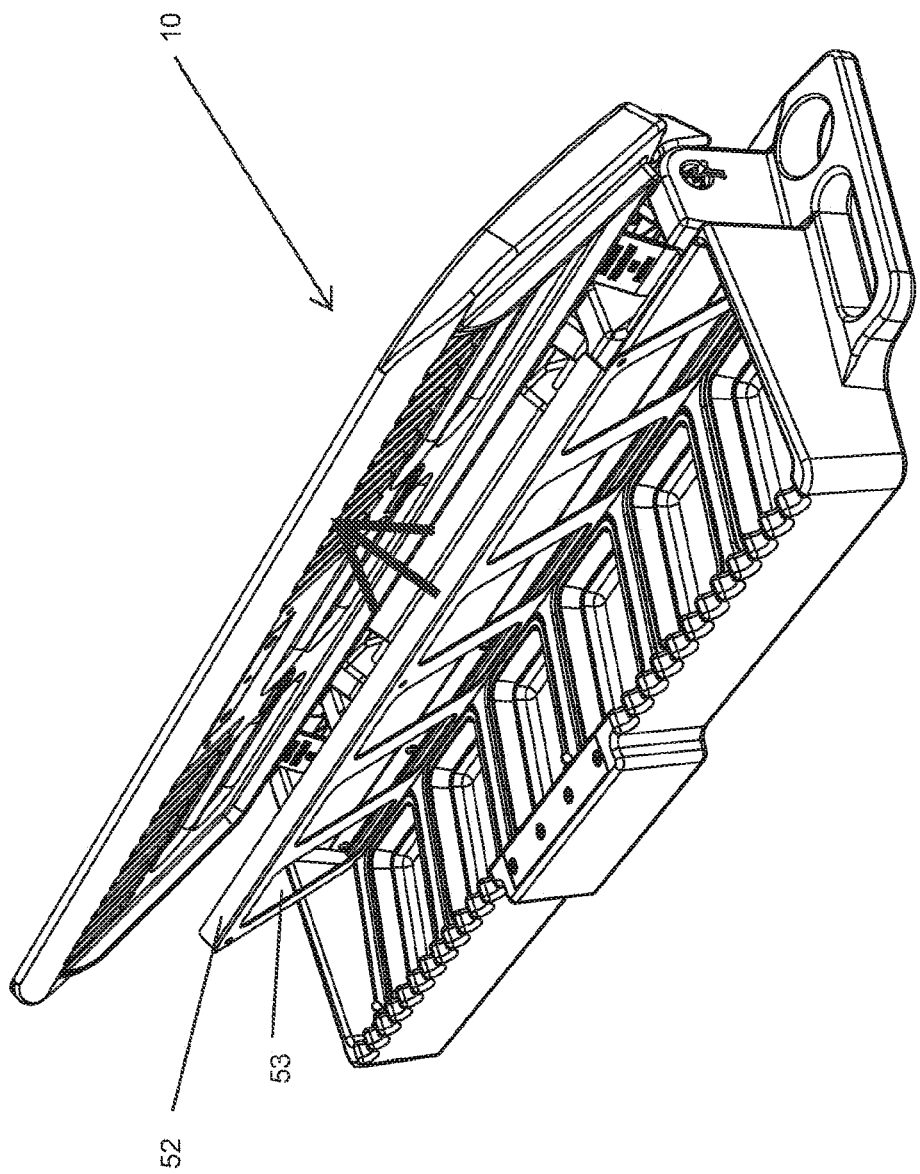
FIGS. 21 and 22 illustrate steps for removing the tray retaining plate of the feeder of FIG. 18 according to one embodiment.
Figure 22:
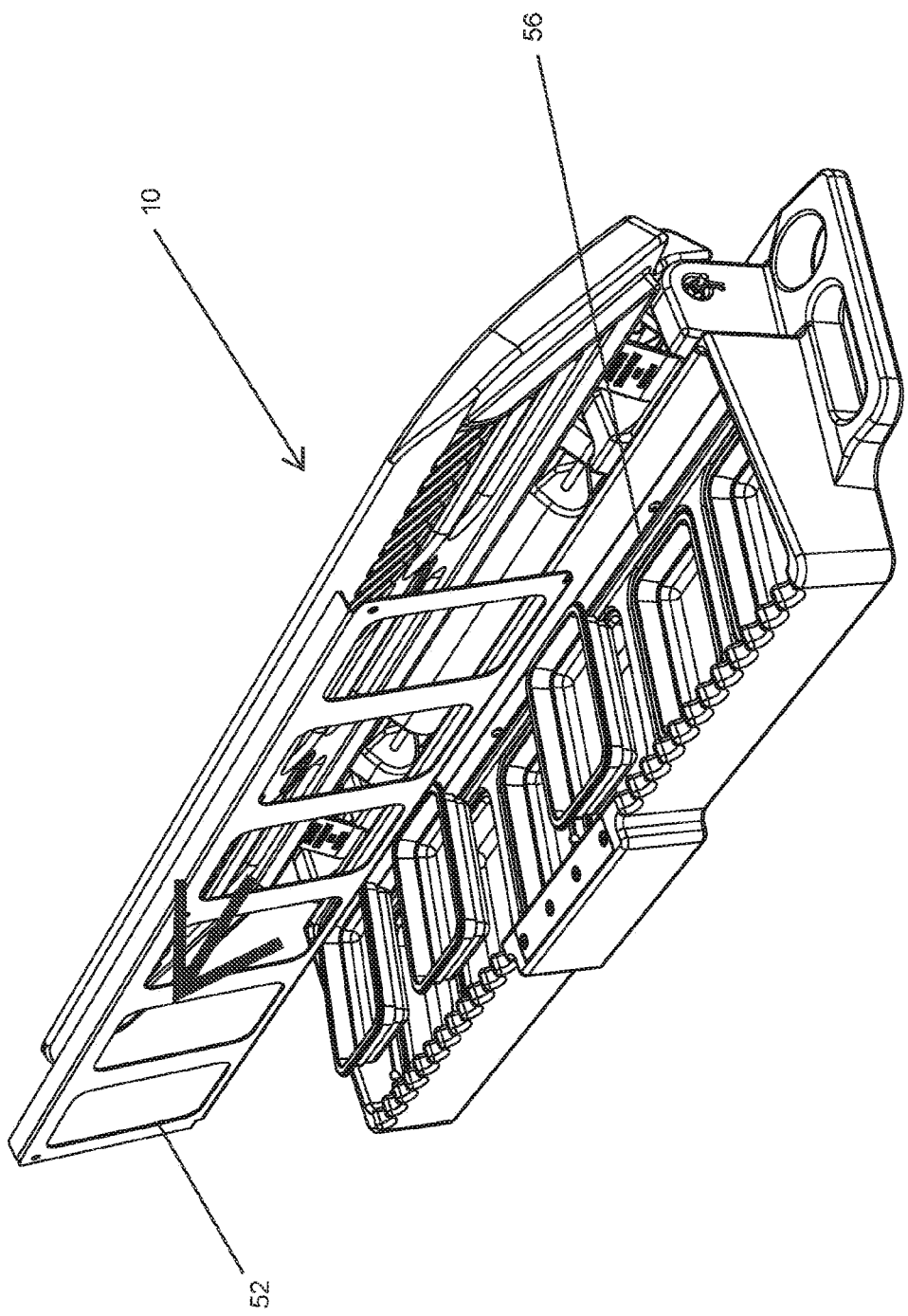
Figure 23:
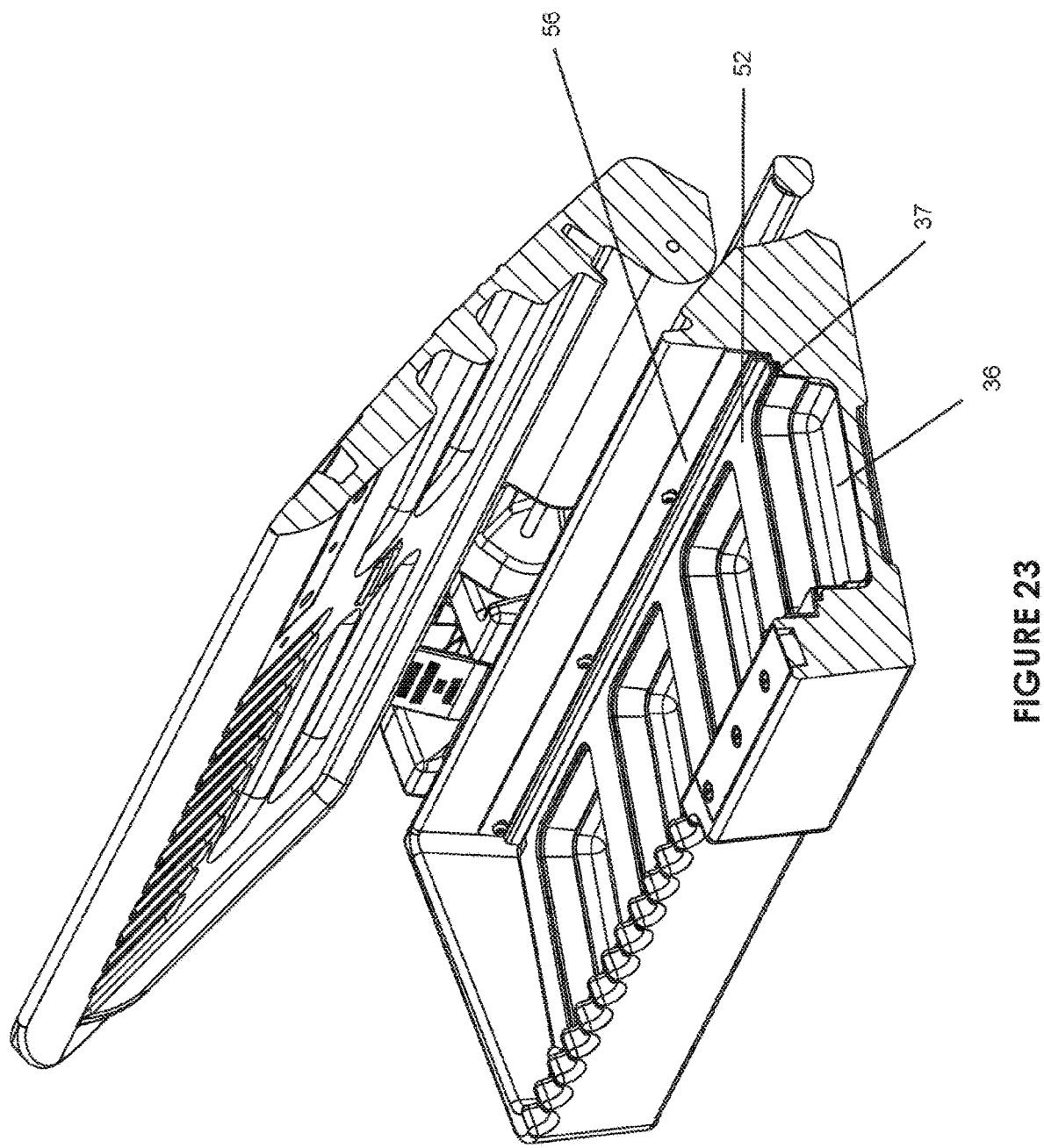
FIGS. 23 and 24 are sectional views of the feeder corresponding to FIGS. 19 and 20 respectively.
Figure 24:
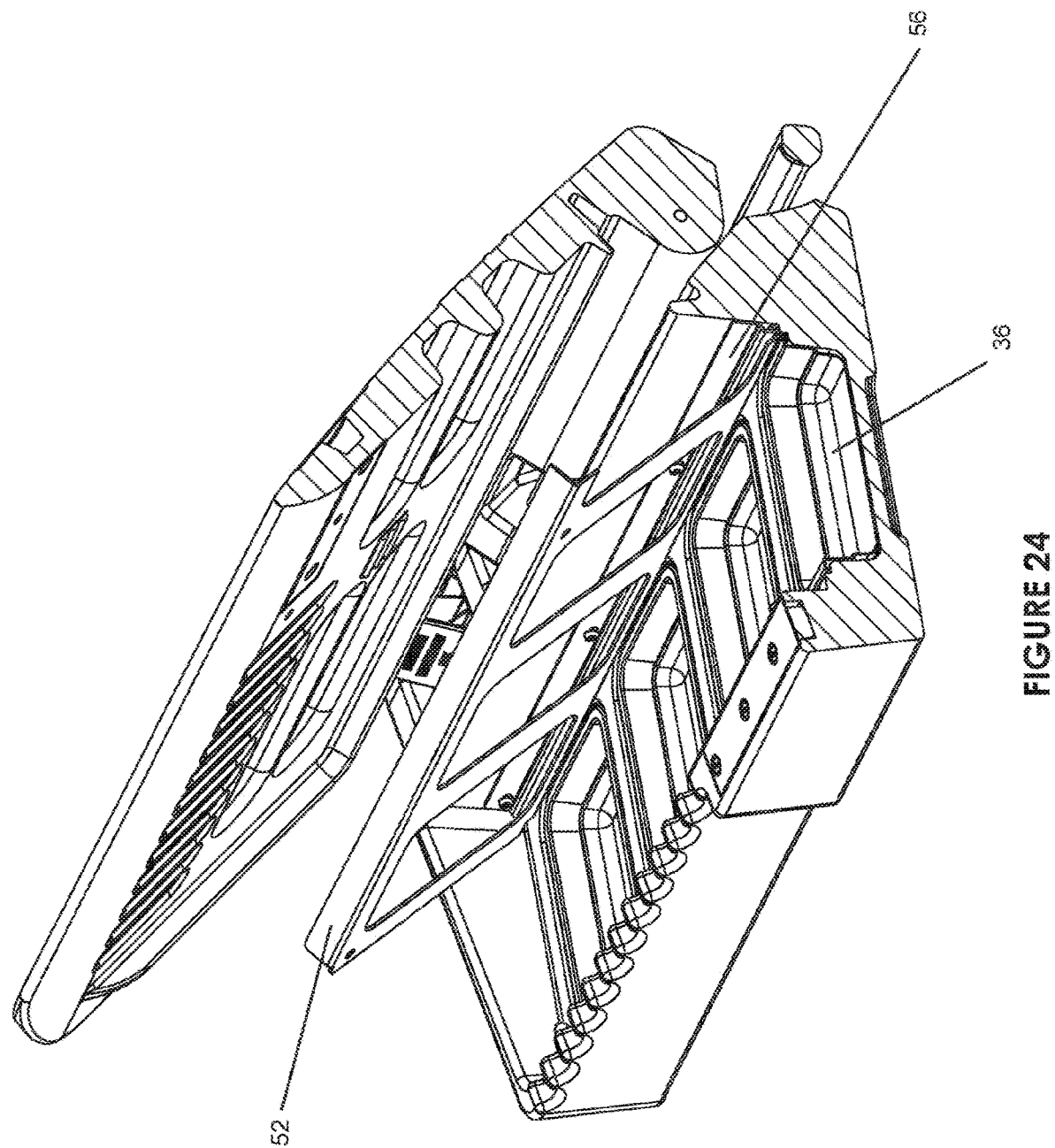
Figure 25:
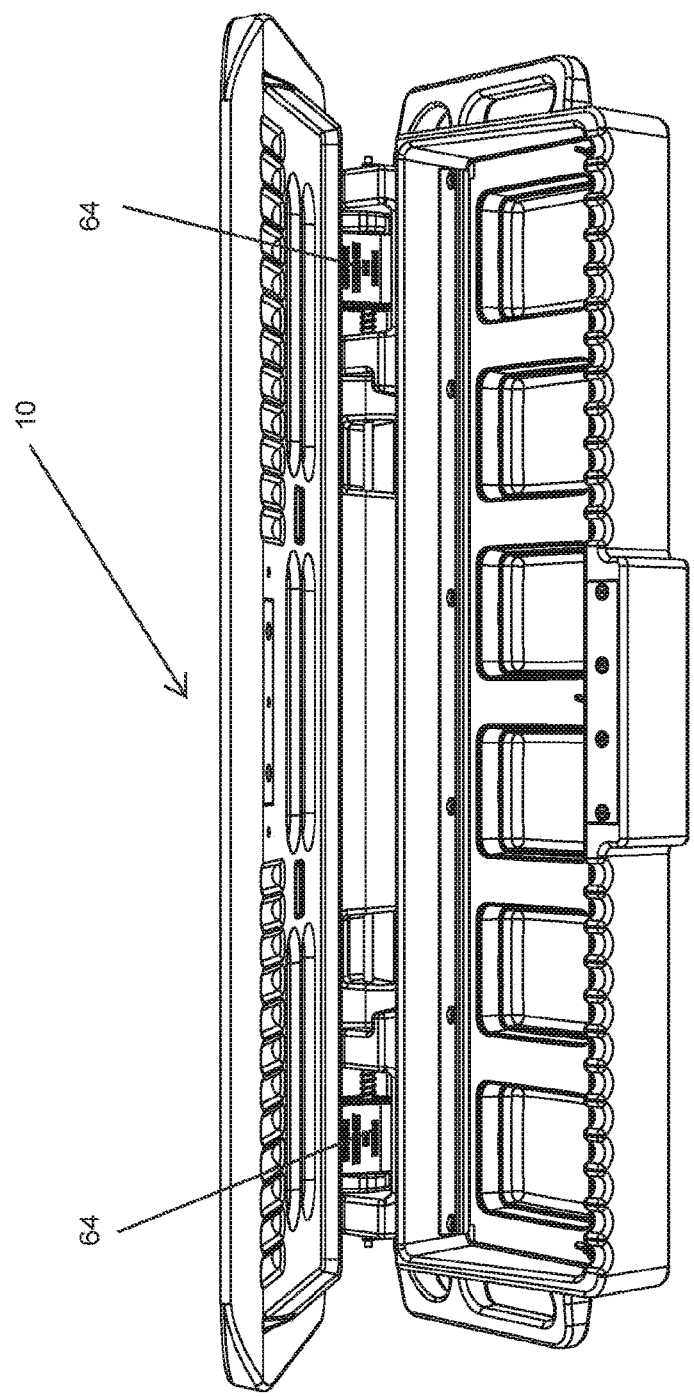
FIG. 25 illustrates a feeder comprising a training device according to another embodiment.
Figure 26:
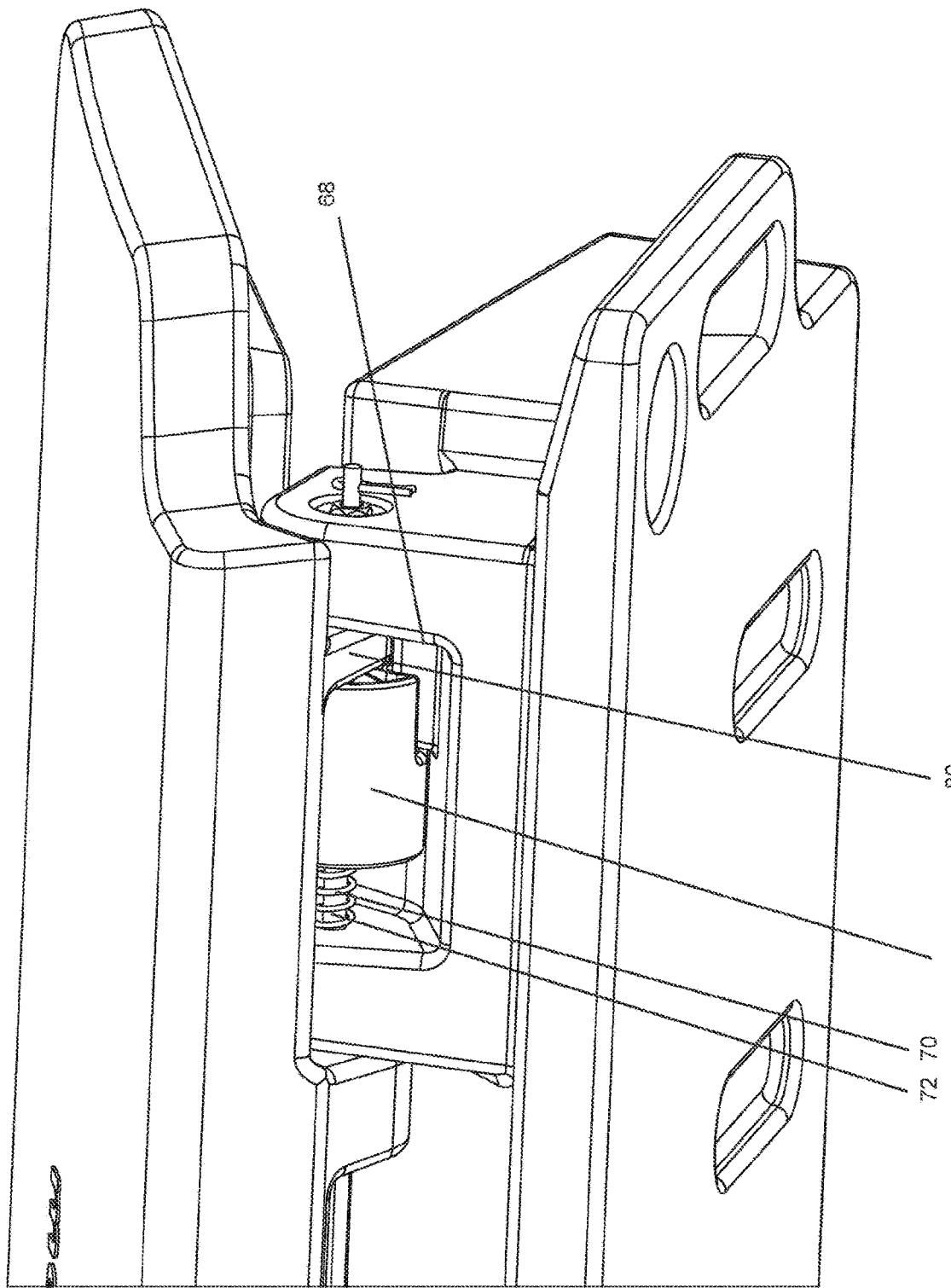
FIG. 26 is a close up view illustrating the cam retainer of FIG. 25.
Figure 27:
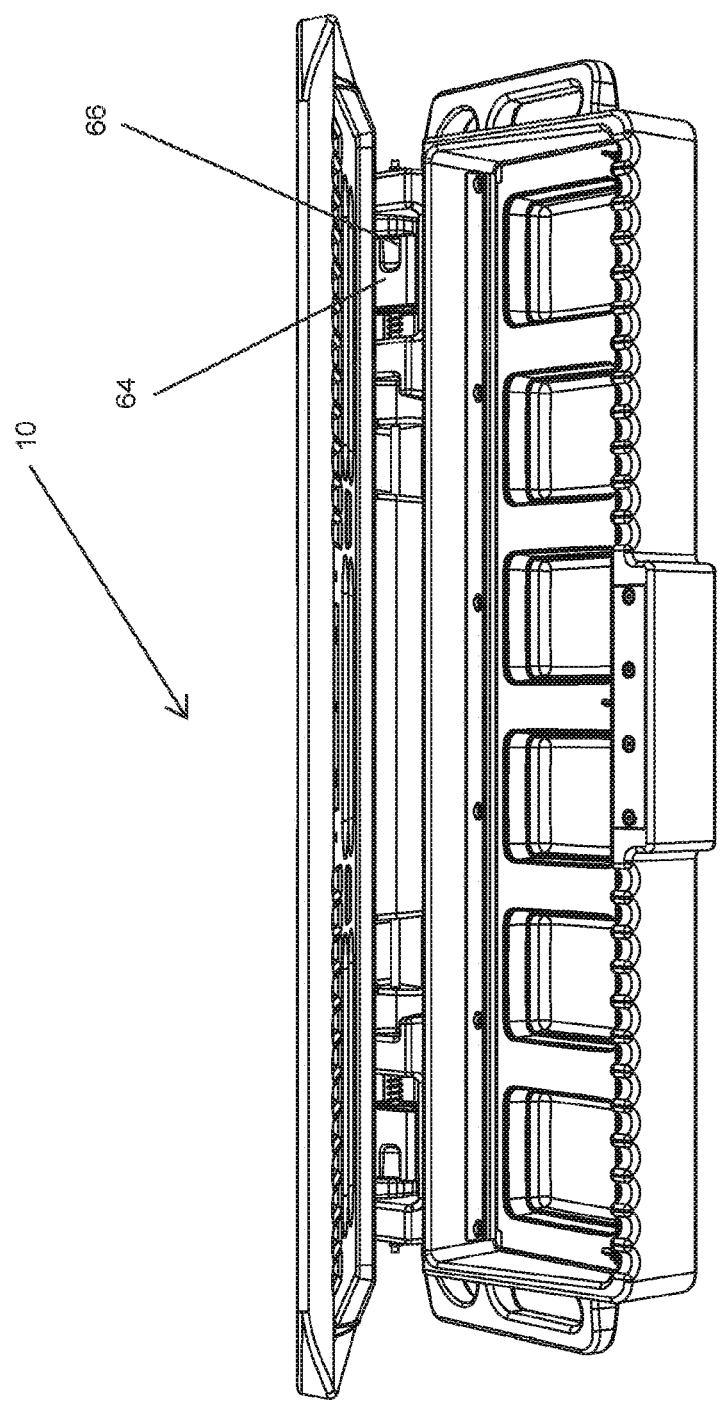
FIG. 27 illustrates the feeder of FIG. 25 with the cam retainers in non-operational configuration.
Figure 29:
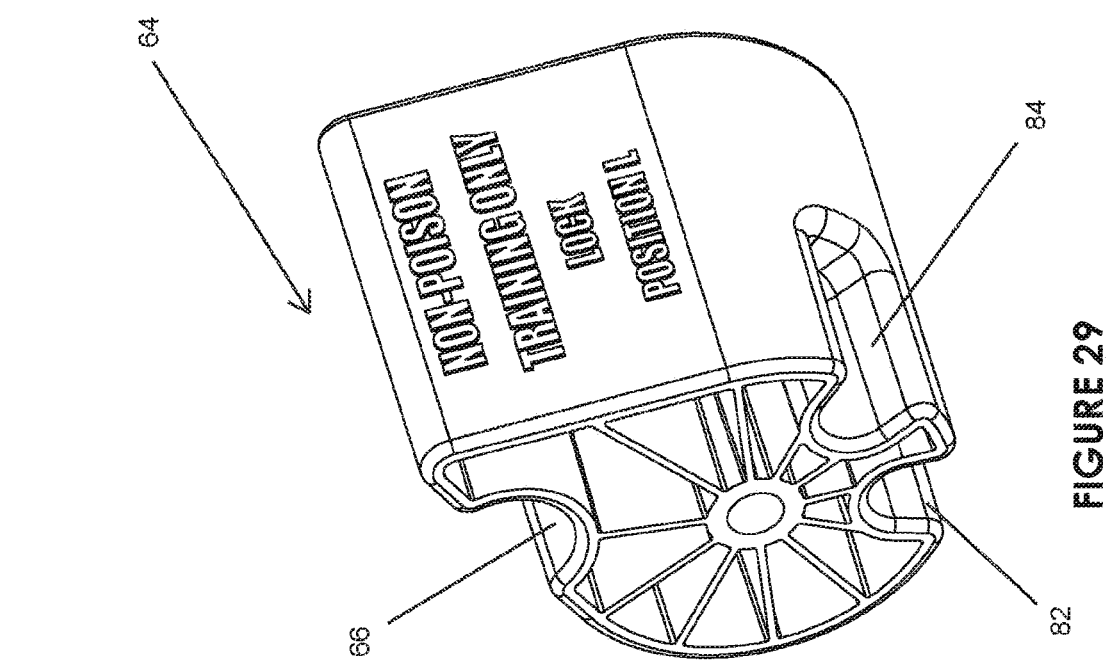
FIGS. 28 and 29 illustrate the cam retainer in isolation.
Figure 28:
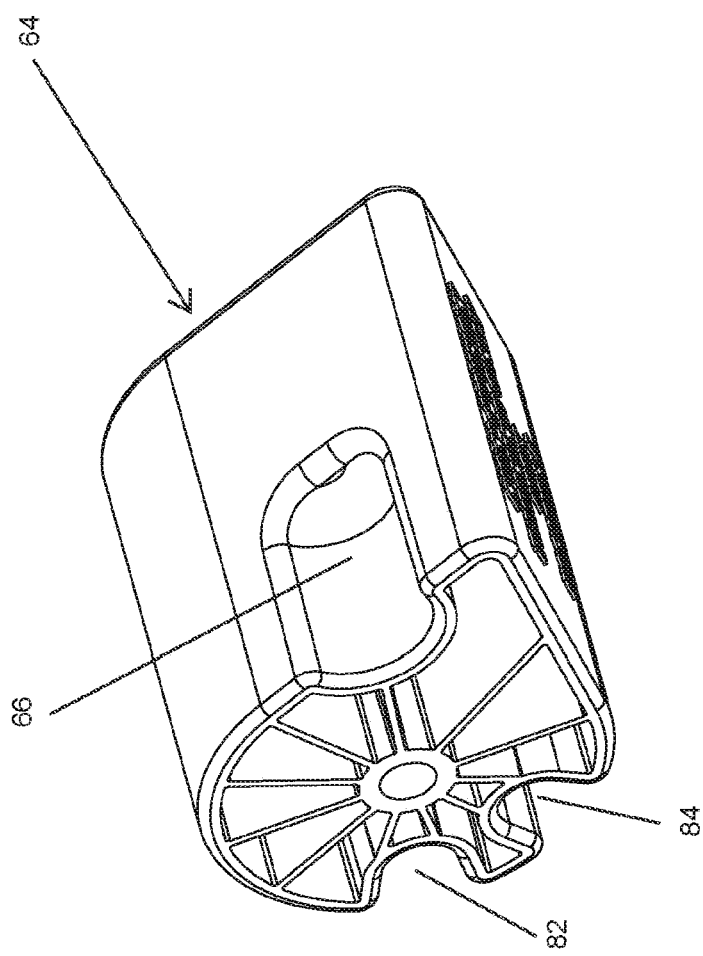

FIGS. 21 and 22 illustrate how the tray retaining plate 52 may be removed from the feeder 10, eg for cleaning. The fasteners 54 of the tray retaining plate 52 are firstly removed. The tray retaining plate 52 may then be slid along retaining track 56 (or lifted out, depending on the configuration of the retaining track 56) and out of the trough.

The cover 4 substantially protects contents of the feeder 10 from wind and rain. In some embodiments, the feeder 10 comprises water diversion channels 38 positioned at perimeter regions of the trough 2 for channeling away from the contents of the trough any rain water that leaks through the cover 4, eg as the cover is lifted.

Figure 9:
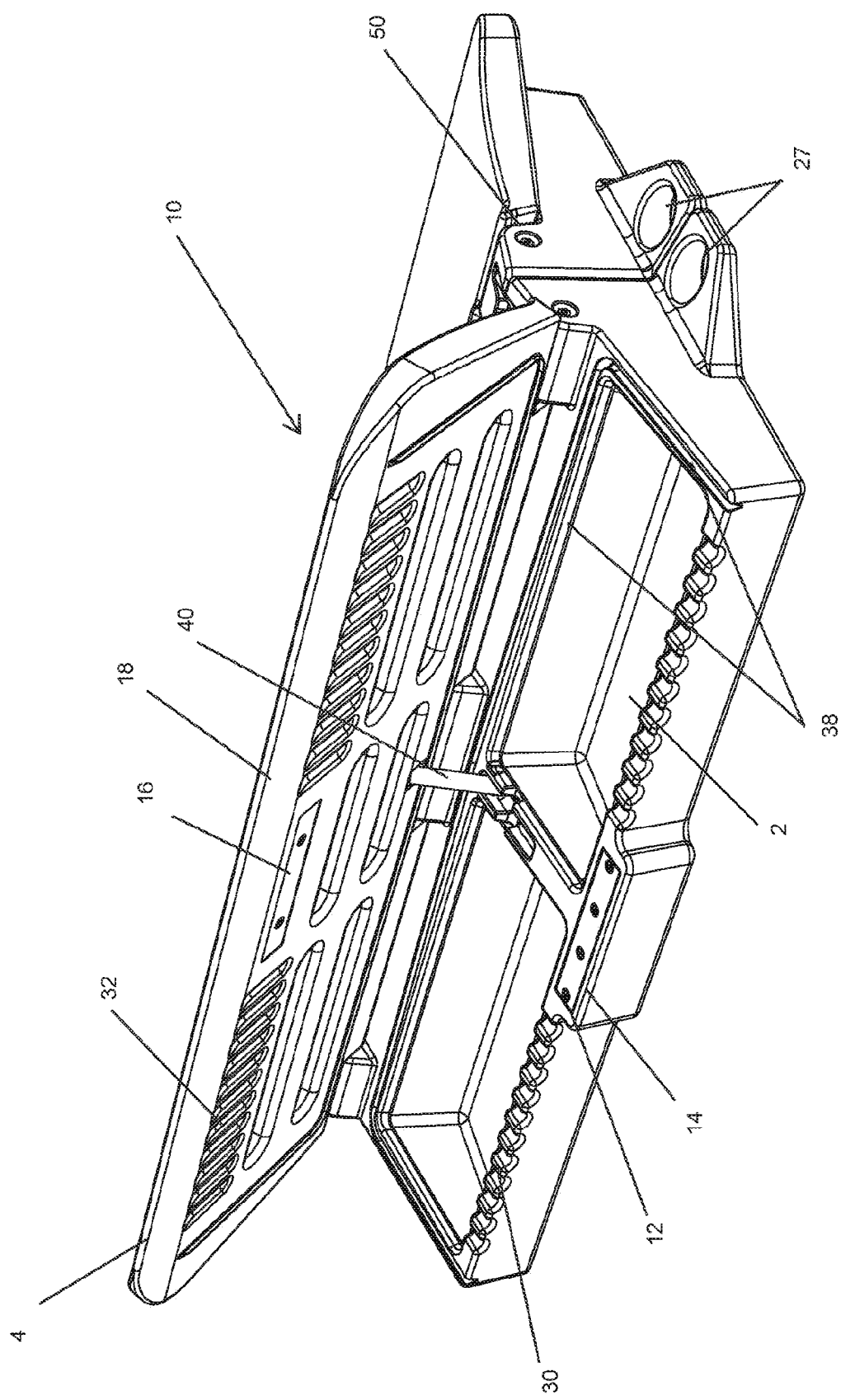
FIGS. 9 and 10 illustrate top and bottom views of the feeder of FIGS. 7 and 8 connected back-to-back with a like feeder.
Figure 10:
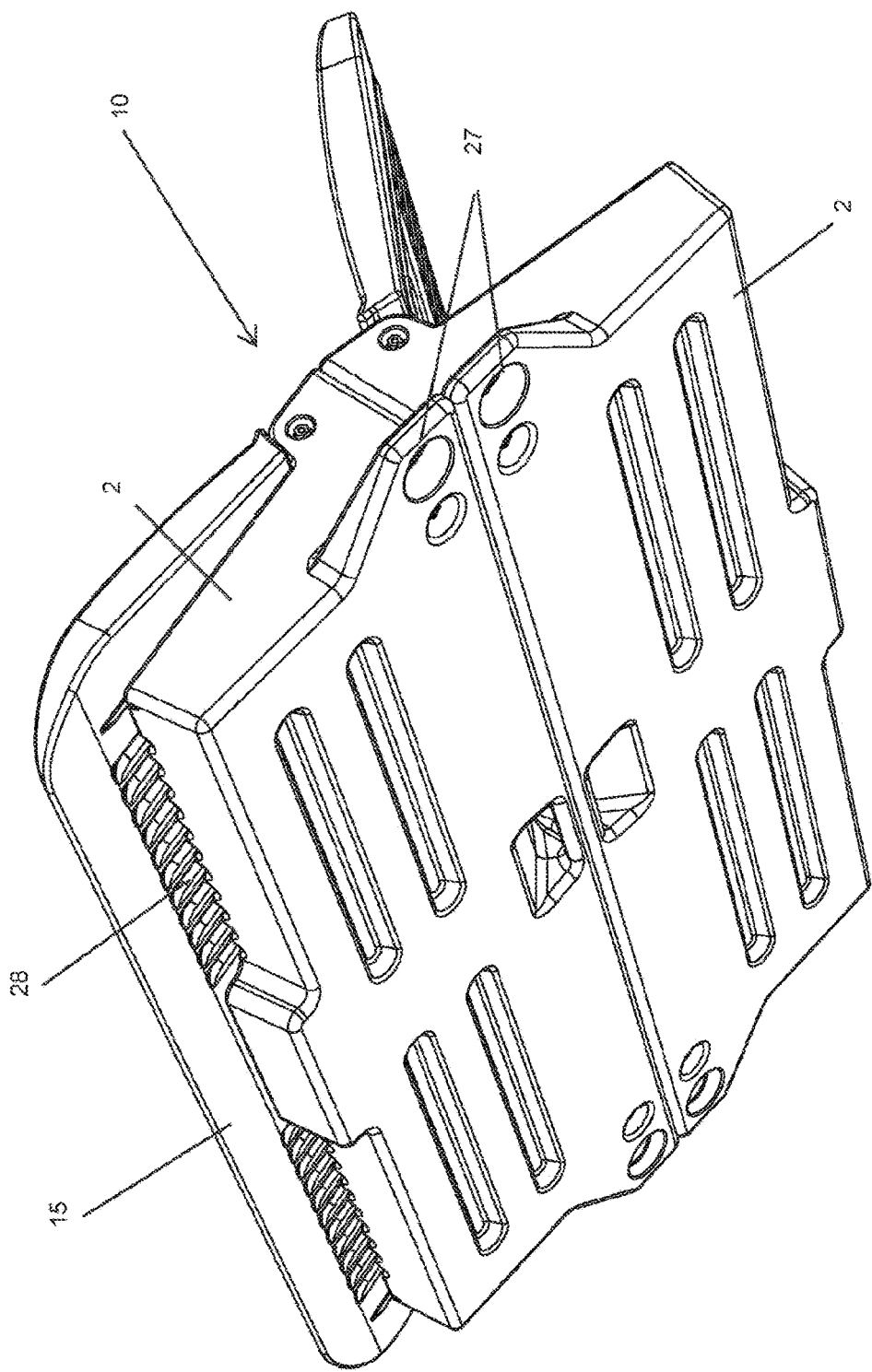
Figure 11:
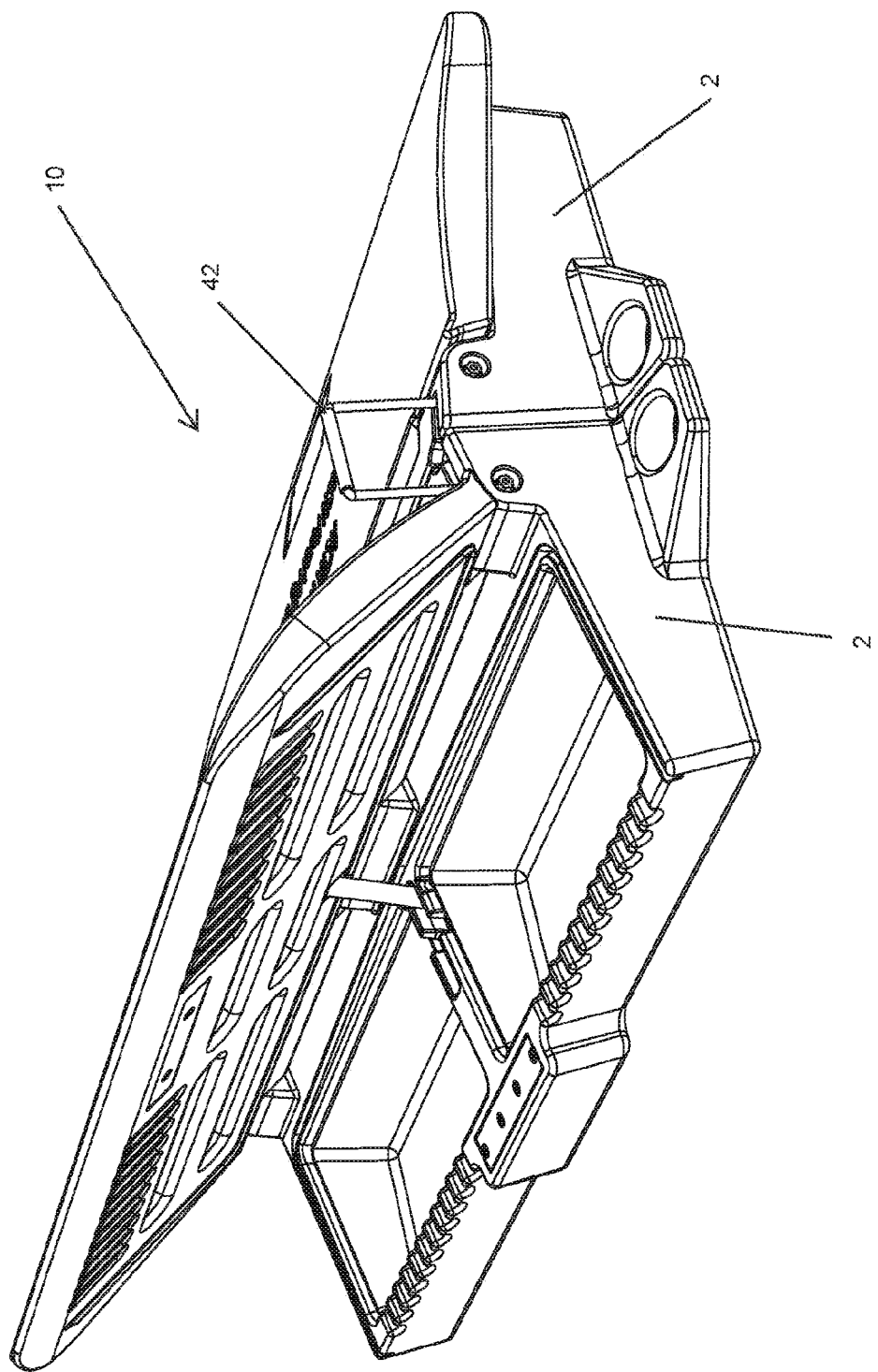
FIGS. 11 and 12 illustrate coupling means for attaching the feeders back-to-back, according to one embodiment.
Figure 12:
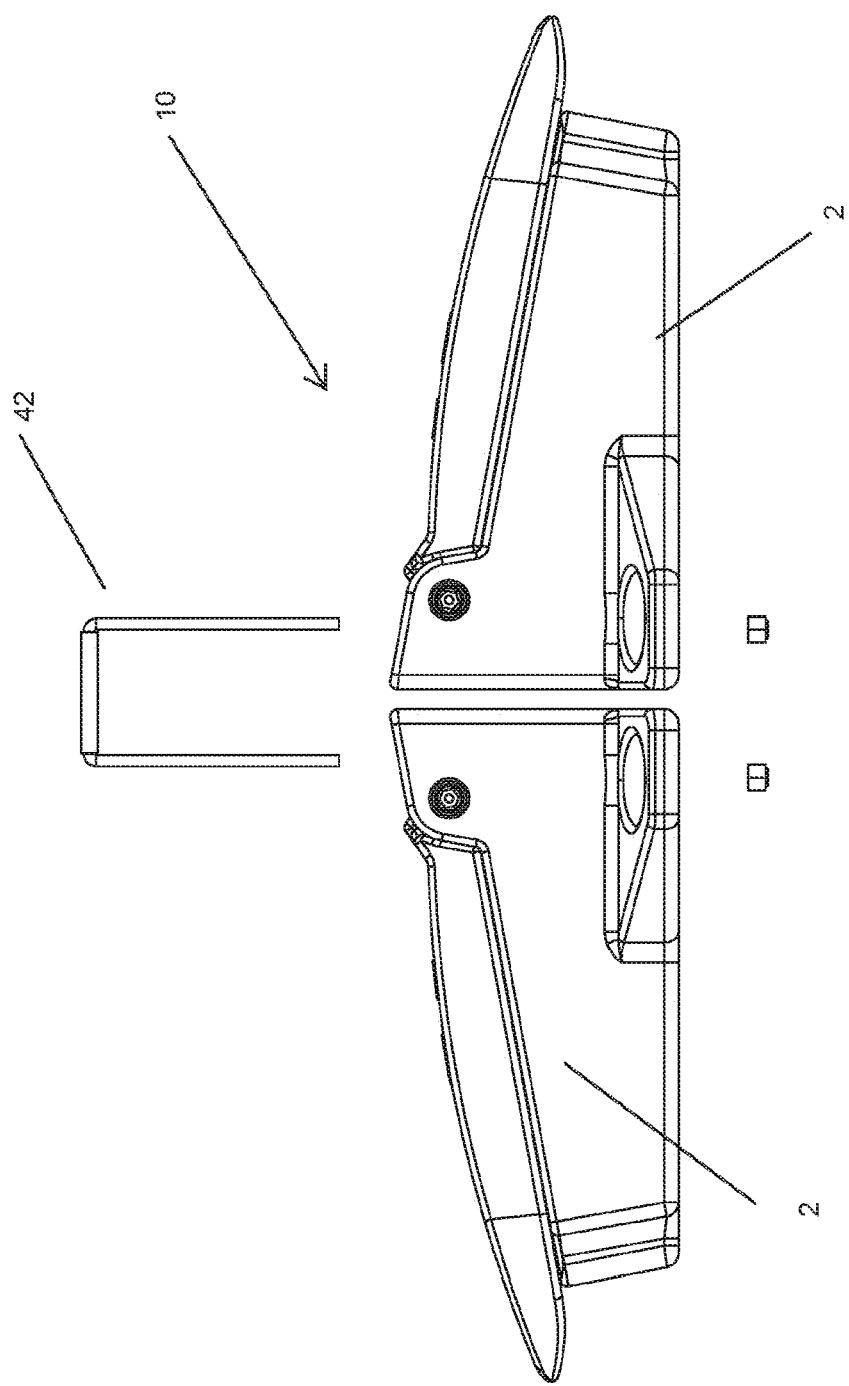

It may be necessary to train the target animal to accept the feeder 10. Initially, free feeding may be allowed, by leaving the cover 4 open and providing non-toxic food material. In some embodiments, a training device/lock (hereinafter "training device") may be provided to retain the cover in an open position during free-feeding training. FIG. 9 illustrates one embodiment in which the training device comprises a training post 40. During free-feeding training, the training post 40 props up the cover 4. After free-feeding training, the training post 40 may be removed from the feeder 10 or stored on/within the trough 2 so that the cover 4 is fully closable.

Figure 15:
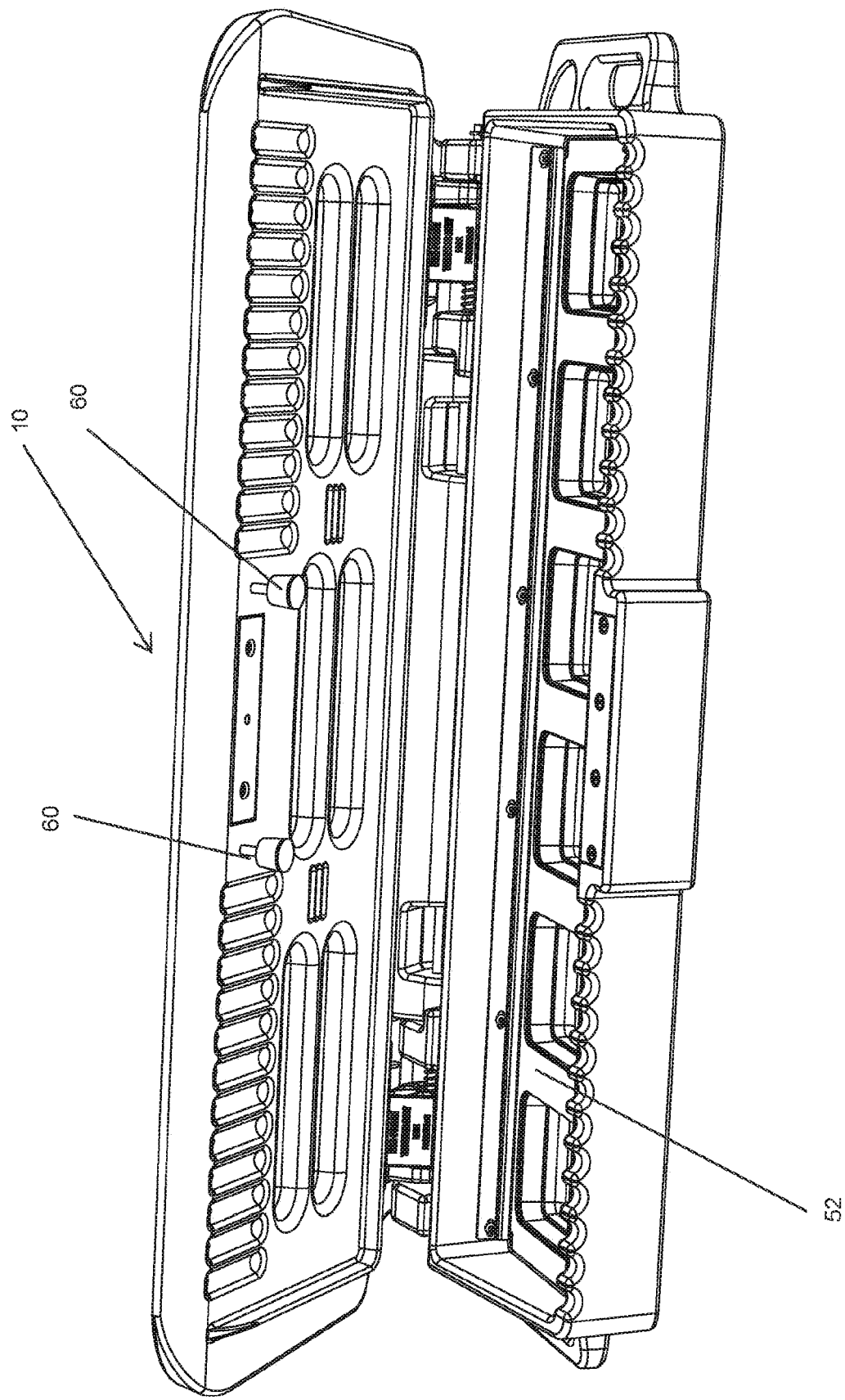
FIG. 15 illustrates a feeder comprising a training device according to another embodiment.
Figure 16:
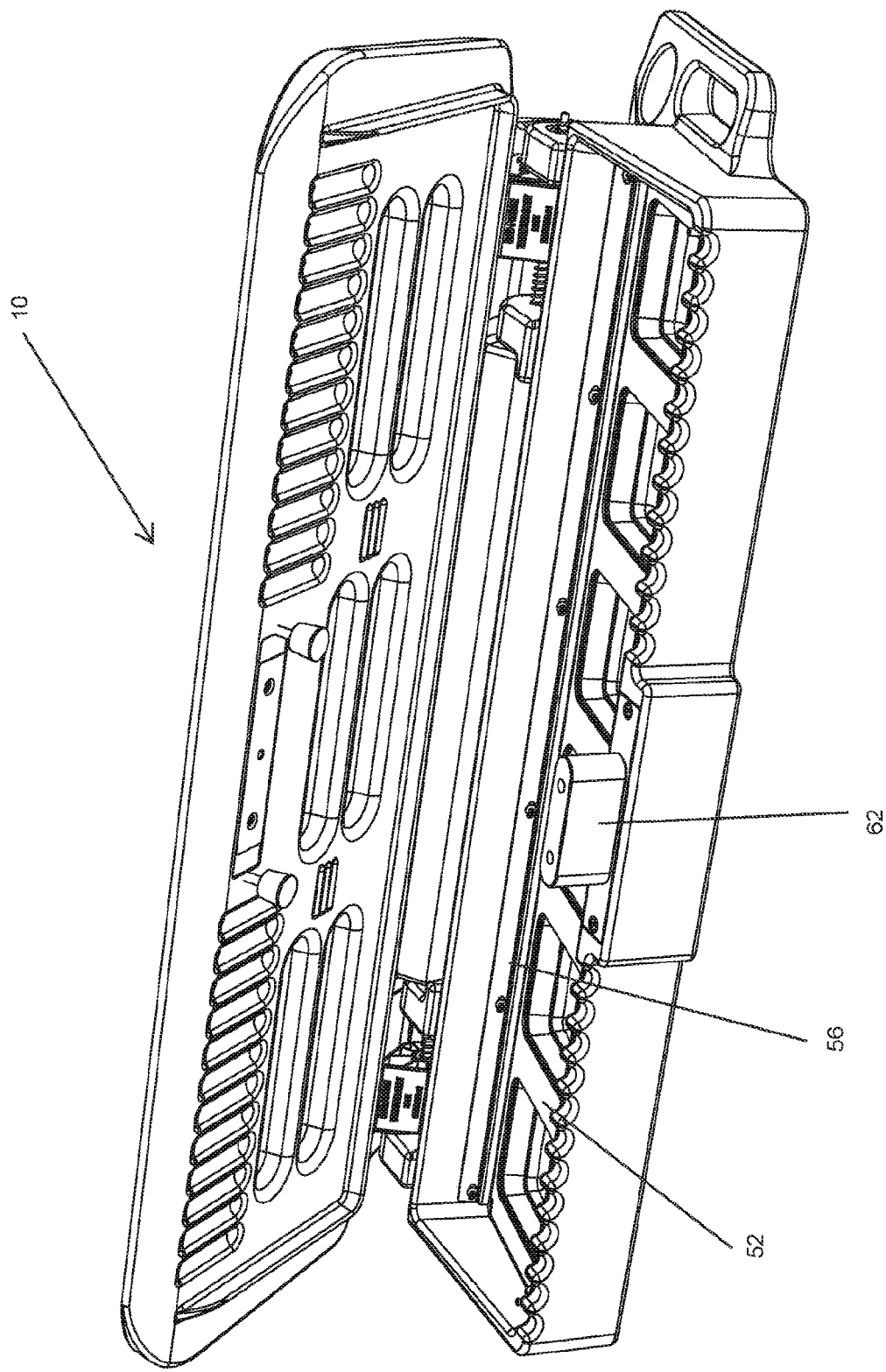
FIG. 16 illustrates a feeder comprising a training device according to another embodiment.

In other embodiments, the training device may additionally or alternatively comprise spacers eg spacer feet 60 illustrated in FIG. 15 or spacer block 62 illustrated in FIG. 16. During free-feeding training, the spacer(s) 60, 62 prop(s) up the cover 4. After free-feeding training, the spacer(s) 60, 62 may be removed from the feeder 10 or retracted or otherwise stored in the feeder, eg within the space defined between the trough 2 and the cover 4, so that the cover 4 is fully closable.

In other embodiments, the training device may additionally or alternatively comprise at least one lock member/cam retainer 64 (hereinafter "cam retainer"), illustrated more clearly in FIGS. 25 to 29. The cam retainer 64 is rotatably mounted to the trough 2 and/or cover 4, and configured to be rotated between an operational (ie training) position and a non-operational position. In the operational position, it abuts the other of the trough and the cover so as to hold the cover open, eg the height of the cam retainer 64 is at its maximum (see the orientation in FIGS. 25 and 29) so that the cam retainer props up the cover 4 in the desired free-feeding training position. When rotated to the non-operational position (see the orientation in FIGS. 27 and 28), the height of the cam retainer 64 is such that the cover 4 is fully closable. A finger slot 66 may be provided on each cam retainer 64 to facilitate operation by the user, ie to facilitate rotation of the cam retainer 64 between the operational and the non-operational positions.

Preferably, at least two cam retainers 64 are provided, spaced along the length of the feeder 1. An aperture 68 may be provided in the trough 2 for housing each cam retainer 64. Mounting rod 70 rotatably retains each cam retainer within the aperture 68. Spring 72 biases the cam retainer 64 so that it bears against lug 80 of the cover 4. Preferably, the cam retainers 64 are mounted at or adjacent the first end of the trough 2, ie the end where the cover 4 is hinged to the trough.

Since the feed in the trough is accessed by the animals from at least one other side of the trough, the cam retainer 64 is out of reach of the feeding animals and does not obstruct access to the trough.

To ensure that the cam retainer 64 is retained in its operational or non-operational position unless deliberately adjusted by the user, the cam retainer 64 comprises two slots 82, 84 configured to engage with a complementary rib (not shown) of the trough 2 when in the operational and non-operational position respectively. The movement of the slots 82, 84 into and out of engagement with the complementary rib also provides tactile feedback to the user when switching the cam retainer 64 between the operational or non-operational states.

Figure 30:
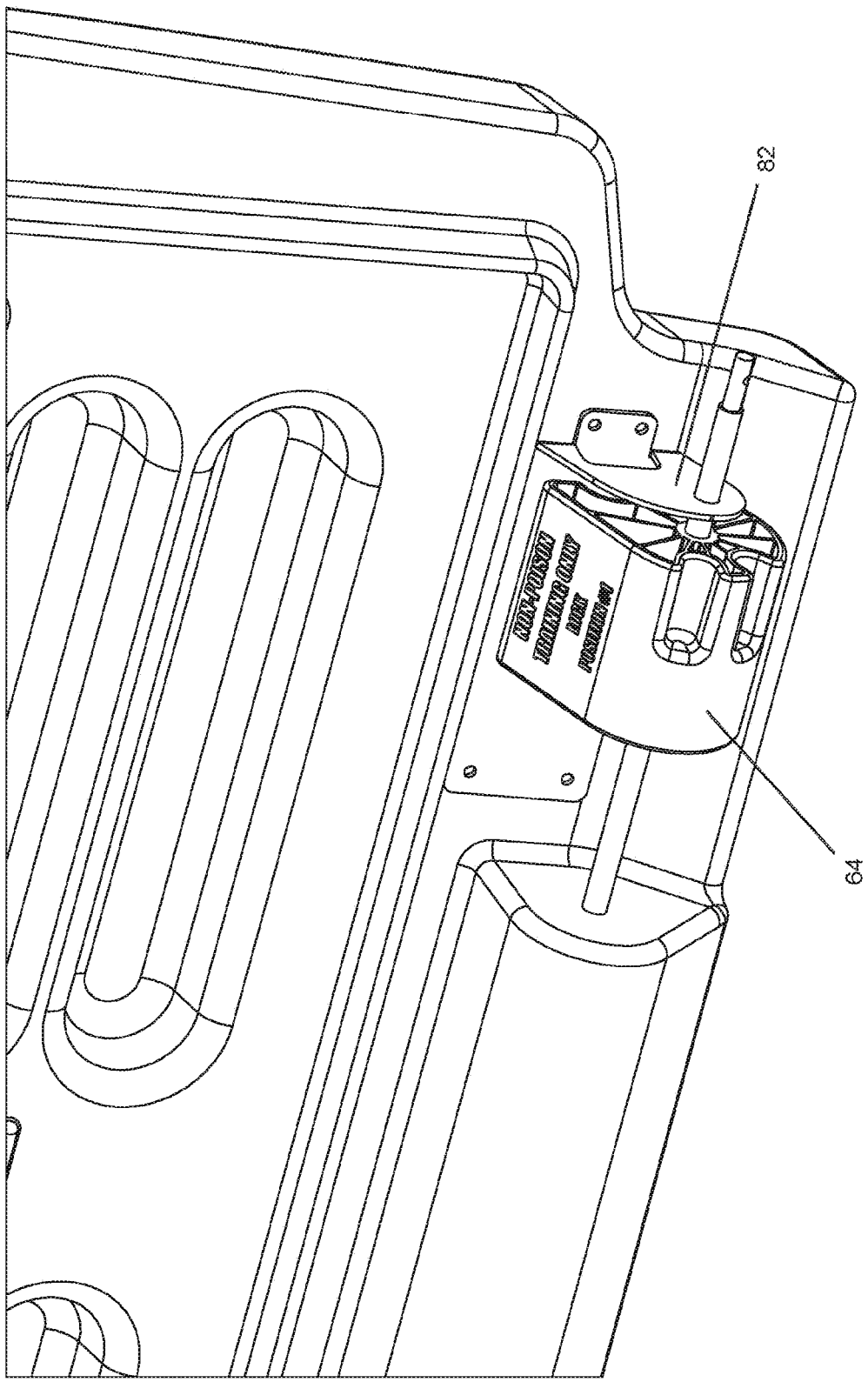
FIGS. 30 and 31 illustrate means for reinforcing the cam retainer mechanism according to different embodiments.
Figure 31:
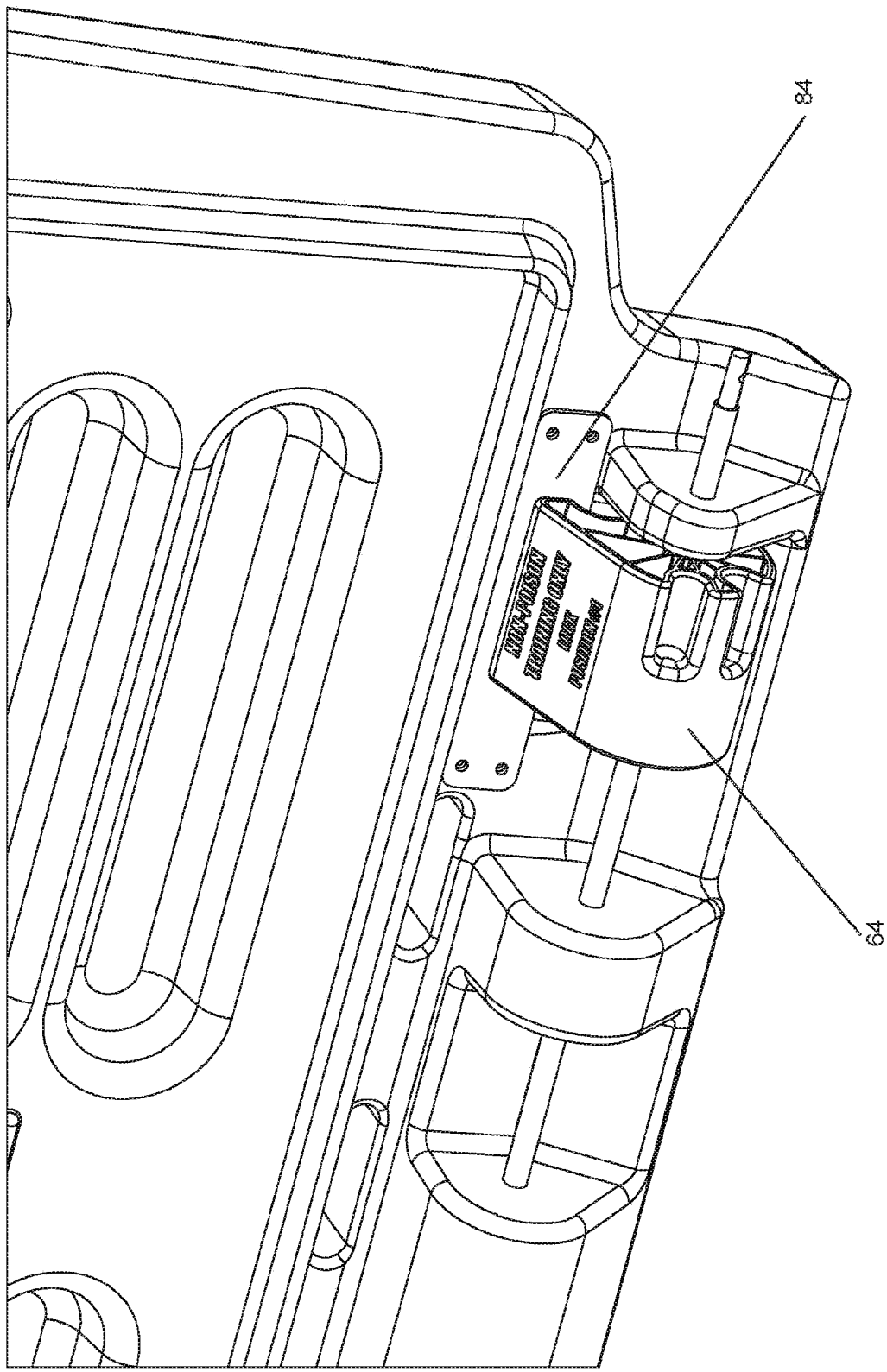

FIGS. 30 and 31 illustrate reinforcement that may be provided on the cover 4 where the cover is supported on/abut the cam retainers 64. The reinforcement bracket 82 in FIG. 30 receives the mounting rod 70 of the cam retainer arrangement (for embodiments where the cover 4 is not provided with mounting lug 80), while the reinforcement plate 84 illustrated in FIG. 31 is independent of the mounting of the cam retainer 64, so is less likely to be pulled off the cover in use.

In some embodiments, the feeder 10 may comprise a hopper or other storage compartment (not shown) configured to automatically refill the trough 2 with food material, to reduce the number of times the feeder 10 has to be manually refilled, particularly during free-feeding training. For example, a hopper can be configured to store several days' worth of refills, and provide the refill via gravity. Other refill mechanisms, eg metered and/or sensored mechanisms, may alternatively be provided.

In one example, the feeder 10 is configured to target wild pigs (*Sus scrofa*) by exploiting their natural feeding behaviors, intellectual capabilities, and physical abilities. Wild pigs exhibit a normal foraging behavior by using their strong neck, nose and forehead to dig and lift in their normal rooting behavior while feeding, or to obtain access to feed, and embodiments of the invention exploit this behavior to more effectively target pigs while excluding other species that generally do not have such foraging ability or strength.

In this example, the feeder is a low-profiled, double-sided plastic feeder with a hinged cover 4 that requires a predetermined level of resistance be exceeded for pigs to open the cover 4 to gain access to bait within the trough 2. Specific design features for targeting pigs include: a) cover 4 is closed with a magnetic pull strength of between about 11 pounds (5 kg) and about 55 pounds (25 kg), preferably about 30 pounds (13 kg), to enable a wild pig to lift the cover while preventing access by smaller animals such as raccoons, b) a snout-engageable portion/overhang 15 (hereinafter "overhang") of about 4 inches (10 cm) is provided along most or all of the perimeter of the feeder (except for the edge hinged to the cover 4) to facilitate opening from nearly any direction, c) the low profile of the cover 4 (about 4 inches (10 cm) from the ground when installed) exploits natural pig rooting behavior, d) the relatively light weight of the cover 4 facilitates acceptance of cover contact during feeding, e) the length of the trough is selected to maximize group feeding side-by-side along each trough, f) the provision of a single cover 4 on each trough 2 enables feeding by a plurality of pigs once the cover has been opened by a capable individual, and g) the position of the open cover 4 restricts view of animals feeding from the opposite side, thereby enabling competing individuals to feed simultaneously. The cover 4 is preferably of a lightweight construction; that is, once the magnetic force is overcome, the cover is sufficiently light to enable a pig to comfortably prop the cover up (eg on its back or back of head) while feeding, and so is not impeded for feeding from the contents of the feeder.

The feeder 10 according to this embodiment is therefore configured for pig-specific access once the cover 4 is closed and secured magnetically to the trough 2, since a) the force required to lift the cover exceeds the physical ability of raccoons, birds and many other non-target species, b) the feeding approach required (i.e., lifting and propping open the cover 4 while feeding) is unnatural to most non-target species such as white-tailed deer, and c) no other openings (larger than the size of the small ventilation holes 28) exist from which to gain access to contents within the trough.

From studies, the inventors have determined that raccoons, a primary non-target species, would not be able to access the feeder if the effective weight of the cover exceeds about 10.2 kg. The inventors have also determined that the lifting abilities of the least-capable pigs likely to visit bait stations alone (20-40 kg individuals) would typically be able to handle the cover weight required to exclude raccoons. Pigs that were willing to approach the feeder were able to access contents of the trough in two studies in which the weights of the cover were 13.6 kg and 18.1 kg. Different configurations of size, shape and combinations of feeder were investigated and it was found that a low-profiled, elongate design with a low front and back-to-back troughs, as described above, provided promising results, by enabling more individuals to feed simultaneously, while minimizing the number of pigs required to lift the covers and provide access to the trough.

While the examples have been directed to pigs, it should be understood that the feeders may be configured to target other animals, by modifying the magnetic pull strength and/or the effective weight of the cover according to the target species.

The invention also relates to methods for selectively feeding and/or baiting one or more specific groups of animals, using the feeder 10 described above. The method comprises a free-feeding training step, involving placing non-toxic food material in the trough and retaining the cover in an open position. After a period of free-feeding training, the food material is replaced with toxic bait and the cover is closed.

The free-feeding training step may further comprise placing non-toxic food material around the feeder (eg scattering non-toxic food material on the ground around the feeder) during free-feeding training, to attract the animals to the feeder.

In some embodiments, the free-feeding training step may include retaining the cover in two or more successive opening positions. The cover may be retained in a first open position for a period of time, and subsequently in a smaller open position for a period of time. For example, in the first open position, the cover may be fully open. For the subsequent smaller open position, the lid may be propped up via the training device (eg post, spacer and/or cam) as described above.

In some embodiments, the free-feeding training step further comprises removing the magnetic securement from the feeder and closing the cover, if it is necessary to further train the specific group of animals to lift the cover without resistance from the magnetic securement.

In yet other embodiments, the free-feeding training step further comprises placing non-toxic feed into the trough and closing the cover, wherein the cover has resistance against opening. The group of animals may therefore be trained to open the cover against the resistance, to access the non-toxic feed within.

While the examples have been directed to baiting one or more specific groups of animals for the purpose of (at least eventually) killing/euthanizing the animals with toxic bait, it should be appreciated that the feeder 10 may alternatively be used for feeding applications, eg for feeding of domesticated animals. For example, the feeder 10 may be used to feed pigs on a farm, while excluding other farm animals, such as chickens, from accessing the feed. The feeder 10 may alternatively be used for baiting applications, ie to bait one or more specific groups of animals for a purpose other than to kill the animals by poisoning, such as to capture, treat, tranquilize, observe, select, trap, count, etc, the animals.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. An apparatus for baiting and/or feeding target animals, comprising:
    a trough to contain bait and/or feed; and
    a closure which can be urged by at least one said target animal so as to move from a closed position, which is such that access by the target animal(s) to said bait and/or feed contained in the trough is precluded, to an open position, which is such that said access is enabled, the closure including at least one snout-engageable portion arranged so as to be engageable from beneath by a snout of at least one said target animal such that the closure is so urged, the apparatus being-:
    configured such that the closure offers a resistance to being moved which is sufficient that it cannot be urged by a non-target animal to move from the closed position to the open position; and
    configured with at least one void provided for ventilation, or arranged such that a scent of said bait/feed contained in the trough can carry therethrough to be detectable by a said target animal, when the closure is in the closed position; and
    wherein the or each void opens through an upper edge of the trough arranged to be abutted by the closure when in the closed position and spaced from the closure when in the open position, and wherein the closure is configured with at least one said void which is arranged to align, when the closure is in the closed position, with a respective other said void which opens though said upper edge, such that there is defined at least one aperture, comprising respective aligned voids, through which said scent can carry.

2. An apparatus according to claim 1, including a lock operable, to hold the closure open, whereby access to the bait and/or feed by said target animals is facilitated or permitted.

3. An apparatus according to claim 2, wherein the lock comprises at least one lock member mounted to one of the trough and the closure so as to be rotatable between an operative position, in which it abuts the other of the trough and the closure so as to hold the closure open, and an inoperative position, which is such that movement of the closure to the closed position is permitted.

4. An apparatus according to claim 3, wherein the closure is pivotably connected at a proximal end thereof to one side of the trough, such that, when the closure is in the open position, the bait/feed is accessible by the target animal(s) from at least one other side of the trough, and the or each lock member is mounted at or adjacent said proximal end so as not to obstruct said access.

5. An apparatus according to claim 2, wherein the lock is adjustable, or operable, to hold the closure open to varying extents whereby access to the bait by the target animal(s) is facilitated or permitted.

6. An apparatus according to claim 2, wherein the lock comprises at least one prop arranged to extend between the trough and the closure.

7. An apparatus according to claim 1, wherein the closure and trough comprise coupling components arranged to couple when the closure is in the closed position, whereby the closure offers said resistance, and to decouple upon movement of the closure towards the open position.

8. An apparatus according claim 1, wherein the closure is pivotably connected to said trough to be pivotably movable between the closed and open positions.

9. An apparatus according to claim 1, wherein the closure is bistable so as to offer said resistance in a first condition thereof and not to offer said resistance in a second condition thereof, the apparatus being configured such that the closure assumes said first condition in said closed position and assumes said second condition by being moved towards said open position.

10. An apparatus according to claim 1, configured such that the trough and closure interengage magnetically, whereby the closure offers said resistance, when the closure is in the closed position.

11. An apparatus according to claim 1, wherein the trough comprises a housing and at least one receptacle removably receivable in the housing to hold said bait/feed in the housing, the trough includes a retainer engageable with the or each receptacle to secure it in the housing, the or each retainer comprises a retaining member configured to abut the receptacle(s) to retain it/them in position in the trough, and the or each retaining member is configured with one or more voids, the or each void being arranged to align with an opening of a respective said receptacle abutted by that retaining member, so as to permit access to the bait/feed through the opening.

12. An apparatus according to claim 1, wherein the or each snout-engageable portion is arranged to project outwardly when the closure is in the closed position so as to be so engageable.

13. A system for forming a composite baiting and/or feeding apparatus, the system comprising apparatuses according to claim 1 contiguously arrangeable one-with-another such that there is defined said composite apparatus.

14. An apparatus according to claim 1, wherein the or each void extends through the trough.

15. An apparatus according to claim 1, wherein the or each void is defined by an aperture.

16. An apparatus according to claim 1, wherein the or each snout-engageable portion is be arranged so as to be adjacent said void(s) when the closure is in the closed position.

\* \* \* \* \*